United States Patent [19]

Yamahara et al.

[11] Patent Number: 5,506,706
[45] Date of Patent: Apr. 9, 1996

[54] LIQUID CRYSTAL DISPLAY DEVICE HAVING A PHASE DIFFERENCE PLATE WITH ONE REFRACTIVE INDEX AT AN ANGLE TO THE SURFACE NORMAL

[75] Inventors: Motohiro Yamahara, Osaka; Kei Sasaki, Narashino; Teruyoshi Hara, Yamatokoriyama; Shuichi Kohzaki, Nara, all of Japan

[73] Assignee: Sharp Kabushiki Kaisha

[21] Appl. No.: 79,468

[22] Filed: Jun. 18, 1993

[30] Foreign Application Priority Data

Jun. 26, 1992 [JP] Japan .................................. 4-169539
Oct. 14, 1992 [JP] Japan .................................. 4-276076

[51] Int. Cl.$^6$ ........................... G02F 1/1335; G02B 5/30
[52] U.S. Cl. .................................. 359/73; 359/494
[58] Field of Search .................................. 359/73, 494

[56] References Cited

U.S. PATENT DOCUMENTS 5,184,237  2/1993  Iimura et al. ........................... 359/63

FOREIGN PATENT DOCUMENTS 63-239421  10/1988  Japan .................................. 359/73
4-3110     1/1992   Japan .
4-113301   4/1992   Japan .
4-101119   4/1992   Japan .
4-120512   4/1992   Japan .
4-153622   5/1992   Japan .

*Primary Examiner*—Anita Pellman Gross
*Attorney, Agent, or Firm*—David G. Conlin; Kevin J. Fournier

[57] ABSTRACT

A phase difference plate capable of eliminating contrast changes due to viewing angle changes of display image, coloring phenomenon of display screen, and black and white reversal phenomenon, and a liquid crystal display device capable of displaying images of high quality are presented. A phase difference plate is a drawn and elongated material possessing optical anisotropy such as high polymer compound formed in a flat plate form, and the direction of the minimum principal refractive index na of the three principal refractive indices na, nb, nc of the index ellipsoid is parallel to the y-axis direction, and the direction of the principal refractive index nb is inclined to the normal direction of the surface.

13 Claims, 32 Drawing Sheets

LIQUID CRYSTAL DISPLAY DEVICE HAVING A PHASE DIFFERENCE PLATE WITH ONE REFRACTIVE INDEX AT AN ANGLE TO THE SURFACE NORMAL

BACKGROUND OF THE INVENTION

1. Field of the Invention

The present invention relates to a phase difference plate and a liquid crystal display device, and more particularly to a liquid crystal display device for improving the viewing angle characteristics of the display screen.

2. Description of the Related Art

The liquid crystal display device using nematic liquid crystal display cell has been hitherto applied widely in numerical value segment type display device such as clock and desktop calculator, and active elements such as thin film transistors are formed on the light transmittable substrate of liquid crystal display cell as the switching means for selectively driving the pixel electrode, and color filter layers of red, green and blue are provided as color display means, and depending on the twist angle of liquid crystal, (a) the active drive type twisted nematic (TN) liquid crystal display system disposing the nematic liquid crystal molecules by twisting 90 degrees, and (b) the multiplex drive type super twisted nematic (STN) liquid crystal display system making use of sharp steepness of transmissivity-liquid crystal applied voltage characteristic by defining the twist angle of nematic liquid crystal cell at 90 degrees or more are known.

In the latter (b) multiplex drive type STN liquid crystal display system, since peculiar coloring is present, the system of disposing optical compensation plates is considered useful for monochromatic display, and depending on the optical compensation plates it is classified into (b-1) two-layer type double super twisted nematic liquid crystal display system using liquid crystal cells twisted and disposed at a twist angle in reverse direction to the liquid crystal cell for display, and (b-2) the film added type liquid crystal display system disposing a film possessing optical anisotropy, and from the viewpoint of lightness of weight and cost, the latter (b-2) film added type liquid crystal display system is considered advantageous.

On the other hand, the former (a) active drive type TN liquid crystal display system is roughly classified into (a-1) normally black system for displaying black color in a state without voltage application to the liquid crystal layer (OFF state) by disposing the polarization directions of a pair of polarizers parallel to each other, and (a-2) normally white system for displaying white color in OFF state by mutually crossing the polarization directions orthogonally, and the normally white system is considered more useful from the viewpoints of display contrast, color reproduction and dependence of display on viewing angle.

In the conventional TN liquid crystal display device, however, since the refractive anisotropy is present in the liquid crystal molecules, and the liquid crystal molecules are disposed at inclination to the upper and lower electrode substrates, and the contrast of the display image varies depending on the viewing angle to observe, and the dependence on the viewing angle increases. In particular, as shown in the plan of the liquid crystal display cell in FIG. 3 or FIG. 19, when the viewing angle is inclined from the screen normal direction to the normal viewing angle direction 38, the display image is colored above a certain angle (this is called coloring phenomenon), or the black and white are inverted (reversal phenomenon). Or as the viewing angle is inclined in the anti-viewing angle direction 39, the contrast drops abruptly.

To improve such dependence on the viewing angle, it may be considered to compensate for the phase of light by placing a phase difference plate having the direction of one principal refractive index of index ellipsoid parallel to the normal direction of the surface, as shown in perspective view in FIG. 7, between the liquid crystal layer and polarizer, but even by using such phase difference plate, there is a limit for improving the reversal phenomenon in the normal viewing angle direction.

SUMMARY OF THE INVENTION

It is hence a primary object of the invention to present a phase difference plate capable of eliminating contrast changes, coloring phenomenon, and reversal phenomenon depending on the viewing angle of the display image in order to solve the conventional problems, and a liquid crystal display device capable of displaying images of high quality by using such phase difference plate.

The invention presents a phase difference plate forming a material having optical anisotropy in a flat plate form, wherein the direction of the principal refractive index of the index ellipsoid is inclined to the normal direction of the surface.

In the invention, of the three principal refractive indices of the index ellipsoid, the direction of the minimum principal refractive index is parallel to the surface, and the directions of the other principal refractive indices are inclined to the surface.

In the invention, of the three principal refractive indices of the index ellipsoid, the direction of the minimum principal refractive index is parallel to the surface, and the angle θ formed by the directions of the other principal refractive indices and the surface is in the condition of $20° \leq \theta \leq 70°$.

The invention also presents a liquid crystal display device comprising:

a liquid crystal display cell composed of a liquid crystal layer interposed between a pair of light transmittable substrates forming a transparent electrode layer and orientation film on the surface, a pair of polarizers disposed at both sides of the liquid crystal display cell, and at least one phase difference plate interposed between the liquid crystal display cell and polarizers.

The invention presents a phase difference plate, not having refractive index anisotropy within the surface, with the principal refractive index nb in the normal direction of the surface smaller than the principal refractive indices na, nc within the surface, of which refractive index anisotropy is negative, wherein the direction of the principal refractive index nb is inclined to the normal direction of the surface, and the direction of the principal refractive index nb in the normal direction and the direction of the principal refractive index nc or na within the surface are inclined counterclockwise or clockwise about the direction of the principal refractive index na or nc within the surface.

In the phase difference plate of the invention, first and second phase difference plates composed of the same phase difference plate are stacked up, and the angle of the inclined direction of the principal refractive index nb in the normal direction of each phase difference plate is about 90 degrees.

According to the invention, the angle formed by the direction of inclination of the principal refractive index nb in the normal direction of the first phase difference plate and the direction of inclination of the principal refractive index nb in the normal direction of the second phase plate is about 90 degrees clockwise.

The invention also presents a liquid crystal display device comprising:

- a liquid crystal display cell composed of a liquid crystal layer interposed between a pair of light transmittable substrates forming a transparent electrode layer and an orientation film on confronting surfaces,
- a pair of polarizers interposed at both sides of the liquid crystal display cell, and
- a phase difference plate interposed between the liquid crystal display cell and polarizers.

In the liquid crystal display cell of the invention, the first phase difference plate of the two phase difference plates being stacked up is disposed so that the rubbing direction of the remote side substrate of the liquid crystal display cell may be nearly equal to the inclination direction of the principal refractive index nb in the normal direction of the first phase difference plate, and the second phase difference plate is disposed so that the rubbing direction of the near side substrate of the liquid crystal display cell may be nearly opposite to the inclination direction of the principal refractive index nb in the normal direction of the second phase difference plate.

The invention also presents a liquid crystal display device comprising:

- a liquid crystal display cell composed of a liquid crystal layer interposed between a pair of light transmittable substrates forming a transparent electrode layer and an orientation film on confronting surfaces,
- a pair of polarizers disposed at both sides of the liquid crystal display cell, and
- at least one phase difference plate interposed between the liquid crystal display cell and polarizers.

In the invention, one phase difference plate is interposed between the liquid crystal display cell and polarizer.

Moreover, the invention, the inclination direction of the principal refractive index nb in the normal direction of the phase difference plate is nearly in the opposite direction of the rubbing direction of the near side substrate of the liquid crystal display cell.

According to the invention, light of linear polarization transmits through a material having birefringence such as liquid crystal to generate normal light and abnormal light, and when converted into elliptical polarization according to their phase difference, a phase difference plate having the direction of principal refractive index inclined to the normal direction of the surface is placed at one side or both sides of the member having the birefringence to compensate for the change of phase difference of normal light and abnormal light caused by viewing angle, thereby making it possible to convert into linear polarization in a wide range of viewing angle.

In such phase difference plate, the direction of the minimum principal refractive index of the three principal refractive indices of the index ellipsoid is parallel to the surface, and the directions of the other refractive indices are inclined to the surface, and it is therefore possible to compensate for the phase difference change between normal light and abnormal light for the changes of viewing angle in the direction in the normal viewing angle direction within a vertical plane to the direction of the minimum principal refractive index, including the surface normal line.

Furthermore, when the direction of the principal refractive index is parallel to the surface, and the angle θ formed by the directions of the other principal refractive indices and the surface satisfies the condition of $20° \leq \theta \leq 70°$ the phase may be compensated favorably for the viewing angle change in a range of 0 to 60 degrees in the normal viewing angle direction.

According to the constitution comprising a liquid crystal display cell composed of a liquid crystal layer interposed between a pair of light transmittable substrates forming a transparent electrode layer and an orientation film on confronting surfaces, a pair of polarizers disposed at both sides of the liquid crystal display cell, and at least one phase difference plate interposed between the liquid crystal display cell and polarizers, the coloring phenomenon and reversal phenomenon due to change in viewing angle may be eliminated, so that a liquid crystal display device being free from dependence on viewing angle may be obtained.

According to the invention, when light of linear polarization transmits through a material having birefringence such as liquid crystal to generate normal light and abnormal light, and is converted into elliptical polarization according to their phase difference, at one side or both sides of the member having the birefringence, by placing at least one difference plate, not having refractive index anisotropy within the surface, with the principal refractive index nb in the normal direction of the surface smaller than the principal refractive indices ha, nc within the surface, of which refractive index anisotropy is negative, in which the direction of the principal refractive index nb is inclined to the normal direction of the surface, and the direction of the principal refractive index nb in the normal direction and the direction of the principal refractive index nc or na within the surface are inclined counterclockwise or clockwise about the direction of the principal refractive index na or nc within the surface, the phase difference change of normal light and abnormal light occurring due to viewing angle is compensated, and it is possible to convert into linear polarization over a wide range of viewing angle.

Besides, by stacking up two of such phase difference plates, and defining the angle of the principal refractive index nb of each phase difference place formed in the inclination angle at about 90 degrees, it is possible to compensate not only the phase difference change in the normal viewing angle direction, but also the phase difference change in the anti-viewing angle direction and lateral direction.

The compensation of phase difference change may be executed more securely by staking up the two phase difference plates so that the inclination of the principal refractive index bn in the normal direction of the first phase difference plate and the inclination angle of the principal refractive index nb in the normal direction of the second phase difference plate may form about 90 degrees clockwise.

In the constitution comprising a liquid crystal display cell composed of a liquid crystal layer interposed between a pair of light transmittable substrates forming a transparent electrode layer and orientation film on the surface, a pair of polarizers disposed at both sides of the liquid crystal display cell, and at least one phase difference plate interposed between the liquid crystal display cell and polarizers, the coloring phenomenon and reversal phenomenon can be eliminated, and a liquid crystal display device free from dependence on viewing angle may be realized.

In this case, when disposing one phase difference plate, by arranging so that the inclination direction of the principal refractive index nb in the normal direction of the phase difference plate may be nearly the opposite direction of the rubbing direction of the near side substrate of the liquid crystal cell, the compensation of the phase difference change may be effected more securely. When stacking up two phase difference plates, by disposing the first phase difference plate so that the rubbing direction of the remote side substrate of the liquid crystal display cell may be nearly equal to the inclination direction of the principal refractive index nb in the normal direction of the first phase difference plate, and the second phase difference plate so that the rubbing direction of the near side substrate of the liquid crystal display cell may be nearly opposite to the inclination direction of the principal refractive index nb in the normal direction of the second phase difference plate, the compensation of the phase difference change may be executed more securely.

As described herein, according to the invention, as the phase difference plate inclined in the principal refractive index direction, by using the phase difference plate inclined in the directions of the principal refractive indices nb, nc about the direction of the minimum principal refractive index ha, in particular, it is possible to compensate for changes of phase difference corresponding to the viewing angle or exit angle occurring in the member possessing birefringence such as liquid crystal display cell. Besides, the liquid crystal display device using such phase difference plate is capable of preventing lowering of contrast ratio due to coloring phenomenon and reversal phenomenon, and therefore the contrast ratio in black and white display is not affected by the viewing angle direction, and the quality of display image may be improved outstandingly.

In the invention, relating to the phase difference plate negative in the refractive index anisotropy, with the principal refractive indices in the relation of na=nc>nb, as the phase difference plate inclined in the direction of principal refractive index, by staking up at least one phase difference plate inclined in the direction of principal refractive index nb in the normal direction about the direction of principal refractive index na or nc in the surface, in particular, and in the direction of the other principal refractive index nc or ha, the phase difference corresponding to the viewing angle caused in the liquid crystal display cell may be eliminated, and lowering of contrast ratio due to reversal phenomenon in the liquid crystal display cell, and viewing angle characteristics in the anti-viewing angle direction may be further improved. Therefore, the contrasts ratio in black and white display is enhanced, and the display quality of the liquid crystal display device is improved by far.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
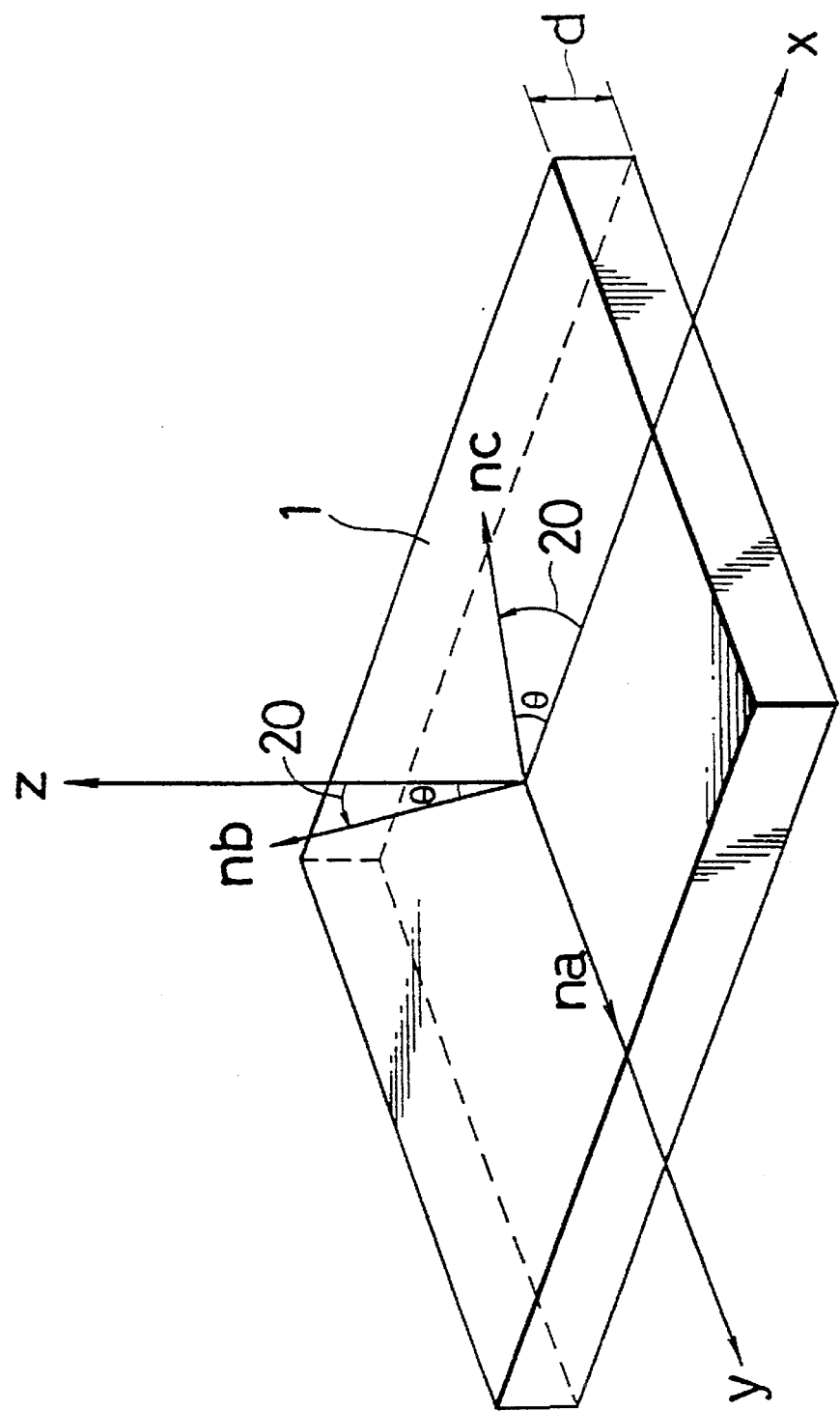
FIG. 1 is a perspective view of a phase difference plate as an embodiment of the invention.

Now referring to the drawing, preferred embodiments of the invention are described below.

FIG. 1 is a perspective view of a phase difference plate in an embodiment of the invention. The phase difference plate 1 is a flat plate in a thickness of d being made of a material possessing optical anisotropy, such as drawn and elongated high polymer compound, for example, polycarbonate and polyester, and defining the surface to be a system of rectangular coordinates xyz on the plane x–y, the direction (the fast direction) of the minimum principal refractive index na of the three principal refractive indices na, nb, nc of the index ellipsoid is parallel to the y-axis direction, and the direction of the principal refractive index nb is inclined in the direction of arrow 20 at an angle of θ around the y-axis about the normal direction of the surface (the z-axis in FIG. 1).

Figure 2:
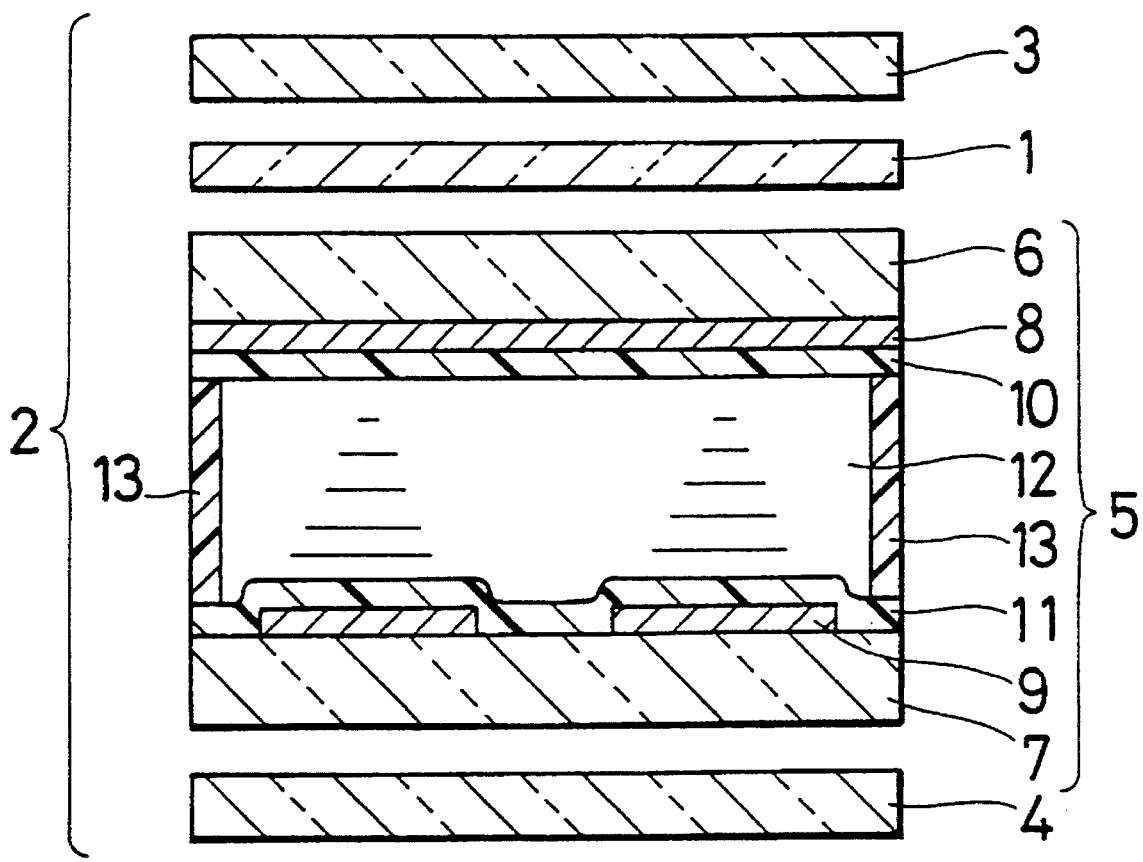
FIG. 2 is a sectional exploded view of a liquid crystal display device as an embodiment of the invention.

FIG. 2 is a sectional exploded view of a liquid crystal display device in an embodiment of the invention. The liquid crystal display device 2 is composed by stacking up in the sequence shown in FIG. 2, comprising a liquid crystal display cell 5 composed by inserting a liquid crystal layer 12 made of nematic liquid crystal or the like by sealing with a sealing member 13, between a pair of glass substrates 6 and 7 forming transparent electrode layers 8, 9 made of ITO (indium tin oxide) and orientation films 10, 11 made of polyimide, polyvinyl alcohol or the like on the surface, a pair of polarizers 3, 4 disposed at both sides of the liquid crystal display cell 5, and a phase difference plate 1 shown in FIG. 1 interposed between the liquid crystal cell 5 and polarizers 3.

Figure 3:
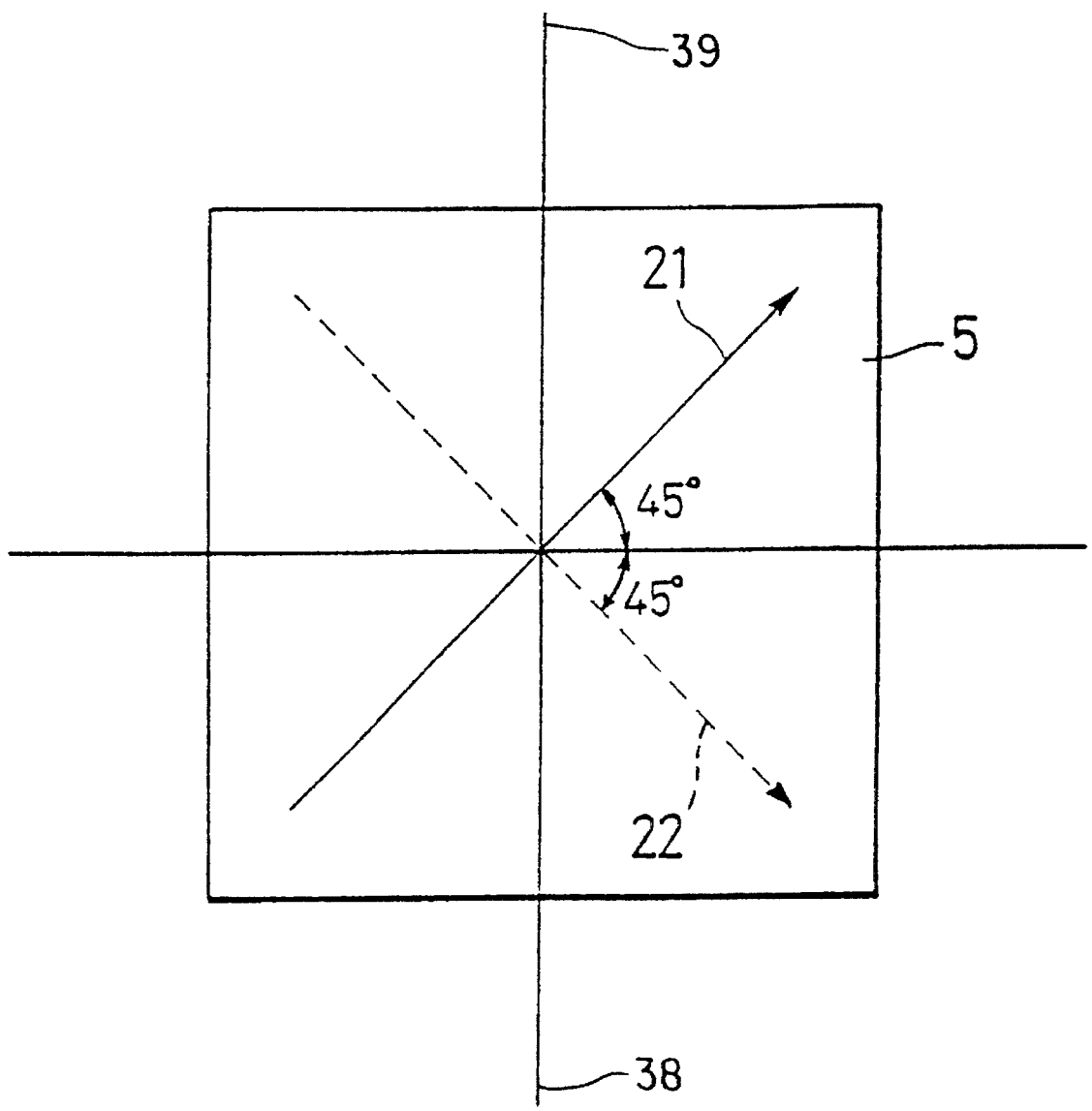
FIG. 3 is a schematic diagram showing the rubbing direction and normal viewing angle direction of liquid crystal display cell.

Each surface of orientation films 10, 11 is preliminarily processed by rubbing so that the intervening liquid crystal molecules may be twisted by about 90 degrees, and as shown in the plan in FIG. 3, the rubbing direction of the orientation film 10 on the glass substrate 6 is the direction of arrow 21, and the running direction of the orientation film 11 on the glass substrate 7 is the direction of arrow 22 vertical to arrow 21.

Figure 4:
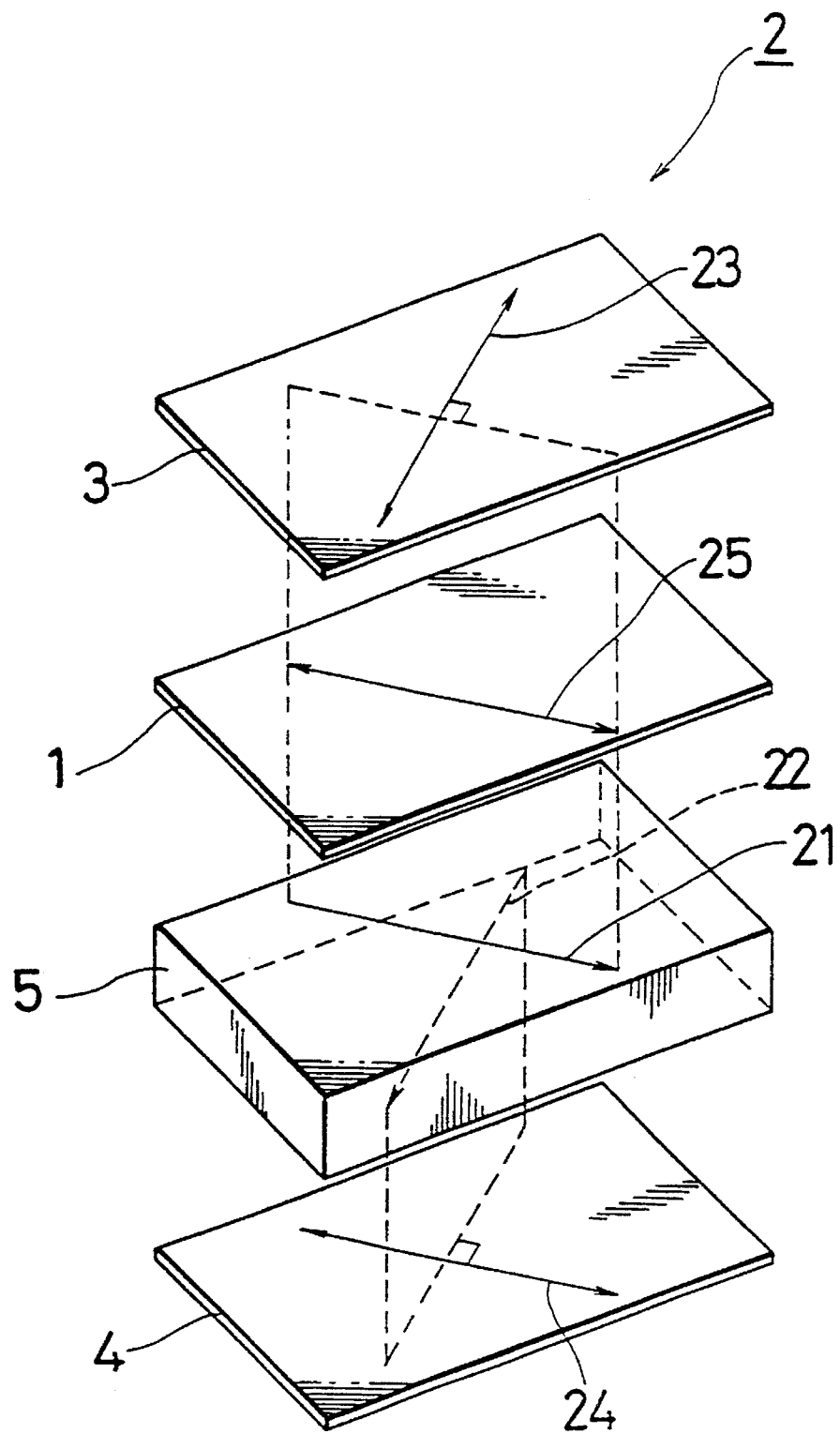
FIG. 4 is a perspective exploded view of the liquid crystal display device 2 shown in FIG. 2.

FIG. 4 is a perspective exploded view of the liquid crystal display device 2 shown in FIG. 2. It is configured so that the transmission axis 23 of a polarizer 3 and the transmission axis 24 of a polarizer 4 may cross orthogonally to each other, and the transmission axis 24 of the polarizer 4, the rubbing direction 21 of the orientation film 10 of the liquid crystal display cell 5, and the fast direction 25 which is the direction of the minimum principal refractive index na of the phase difference plate 1 are set to be parallel to each other, while the transmission axis 23 of the polarizer 3 and the rubbing direction 22 of the orientation film 11 of the liquid crystal display cell 5 are set to be parallel to each other. Therefore, when voltage is not applied to the liquid crystal layer 12 of the liquid crystal display cell 5, it is composed in the so-called normally white display system, that is, white is displayed as the light is allowed to pass through the liquid crystal display device 2. As far as the phase difference plate 1 is placed in any of the polarizer 3 and polarizer 4, the phase can be compensated, or it may be present between the polarizer 4 and the liquid crystal display cell 5, or it may be composed of two or more plates.

Figure 5:
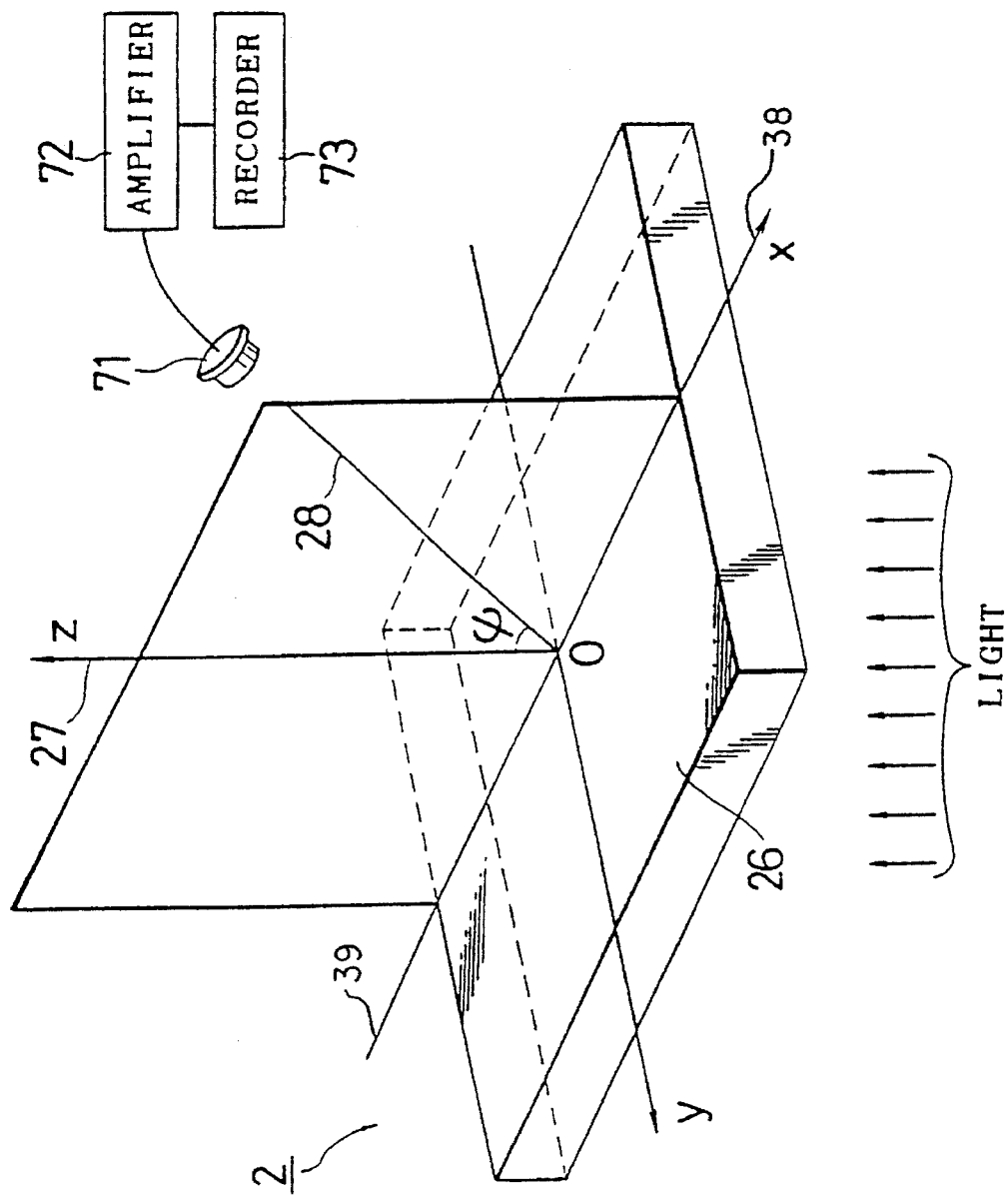
FIG. 5 is a schematic perspective view showing the measuring system of the dependence on the viewing angle of the liquid crystal display device.

A practical example of the liquid crystal display device 2, and the result of measuring its dependence on viewing angle are explained below. FIG. 5 is a schematic perspective view showing the measuring system of the dependence on viewing angle of the liquid crystal display device 2. The contacting surface 26 of the glass substrate 6 of the liquid crystal display cell 5 for composing the liquid crystal display device 2 and the phase difference plate 1 is set on the reference plane x–y of the system or rectangular coordinates xyz, and a photo detector 71 having a specific incidental angle is disposed at a position of specific distance from the origin of coordinates in the direction of angle ψ to the normal direction 27 of the plane 26, and monochromatic light of wavelength 550 nm is emitted from the polarizer 4 side. The output of the photo detector 71 is amplified to a specific level by an amplifier 72, and recorded by recording means 73 such as waveform memory and recorder.

EXAMPLE 1

In the liquid crystal display device 2 in FIG. 2, Using a nematic liquid crystal material of which refractive index anisotropy Δn is 0.08 as the liquid crystal layer 12, the thickness of the liquid crystal layer 12 is set at 4.5 μm, and the high polymer compound such as polycarbonate and polyester is drawn and elongated as the phase difference plate 1, and as shown in FIG. 1, a uniaxial material is used in which the value of the first retardation meaning the product (nc–na)xd of the difference between the principal refractive index nc and principal refractive index na and thickness d of phase difference plate 1 is 0 nm, and the value of the second retardation meaning the product (nc–nb)xd of the difference between the principal refractive index nc and principal refractive index nb and thickness d of phase difference plate 1 is –100 nm, and the direction of the principal refractive index nb is inclined 40 degrees counterclockwise indicated by arrow 20 to the normal line of the surface of the phase difference plate 1, and similarly the direction of the principal refractive index nc forms an angle of 40 degrees to the surface.

Figure 6:
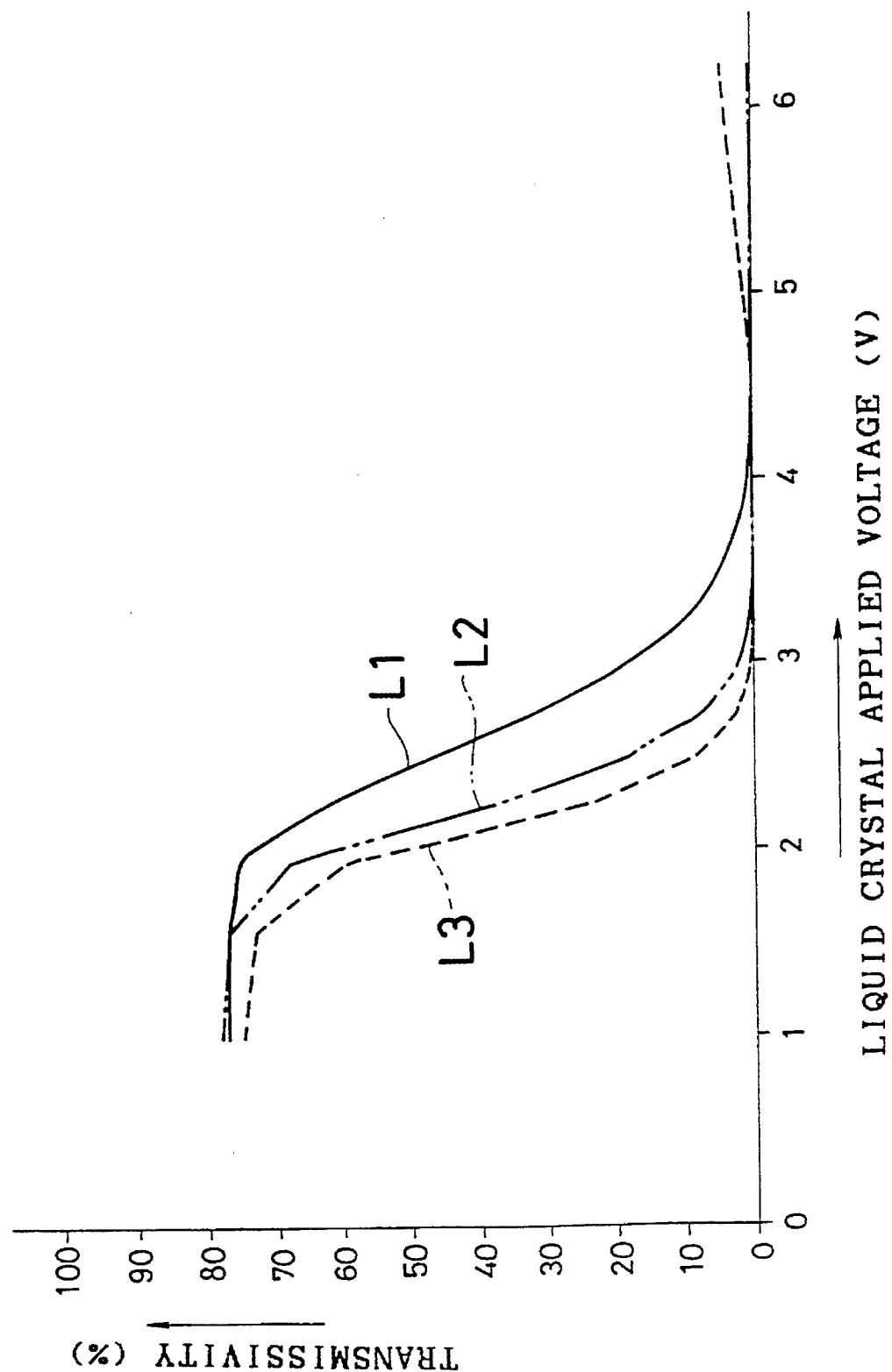
FIG. 6 is a graph showing the transmissivity-liquid crystal applied voltage characteristics of the liquid crystal display device 2 in Example 1.

Such liquid crystal display device 2 is installed in the measuring system shown in FIG. 5, and when the photo detector 71 is fixed at a specific angle ψ, the output level of the photo detector 71 to the applied voltage to the liquid crystal display cell 5 is measured, and the result is expressed as a graph of transmissivity-liquid crystal applied voltage characteristics in FIG. 6. In FIG. 6, line L1 refers to the angle of angle ψ=0 degree, line L2, 30 degrees, and line L3, 45 degrees. It is understood from the findings that the transmissivity is lowered to 0% until around 4.5 V when the liquid crystal applied voltage is raised gradually from zero volt, and is not raised so much if the liquid crystal applied voltage is further elevated. At the liquid crystal applied voltage of around 1 V, the transmissivity is not so different in lines L1, L2, L3, and therefore the improvement of the dependence on viewing angle is understood.

Comparison 1

Figure 7:
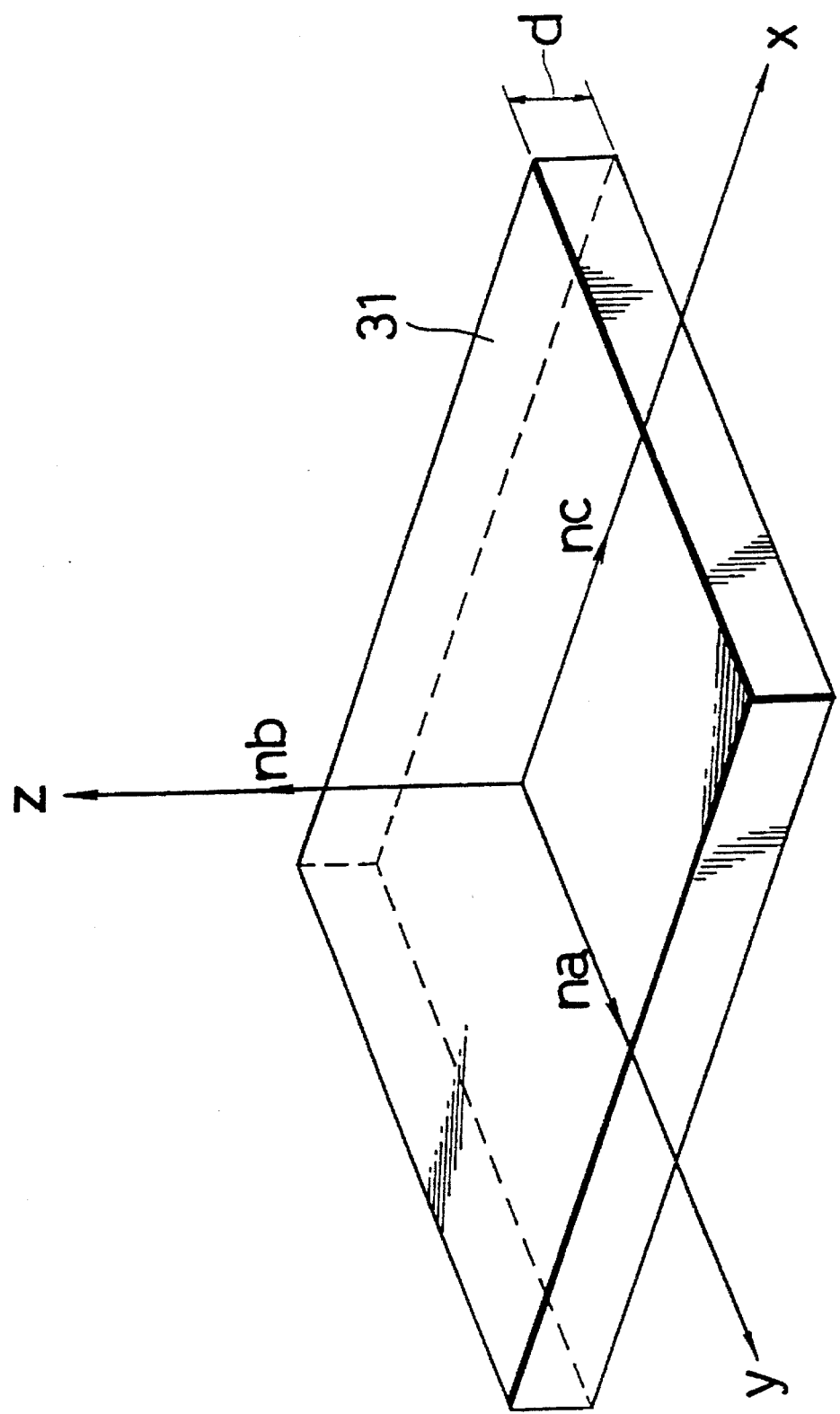
FIG. 7 is a perspective view showing the principal refractive indices na, nb, nc of a conventional phase difference plate 31.
Figure 8:
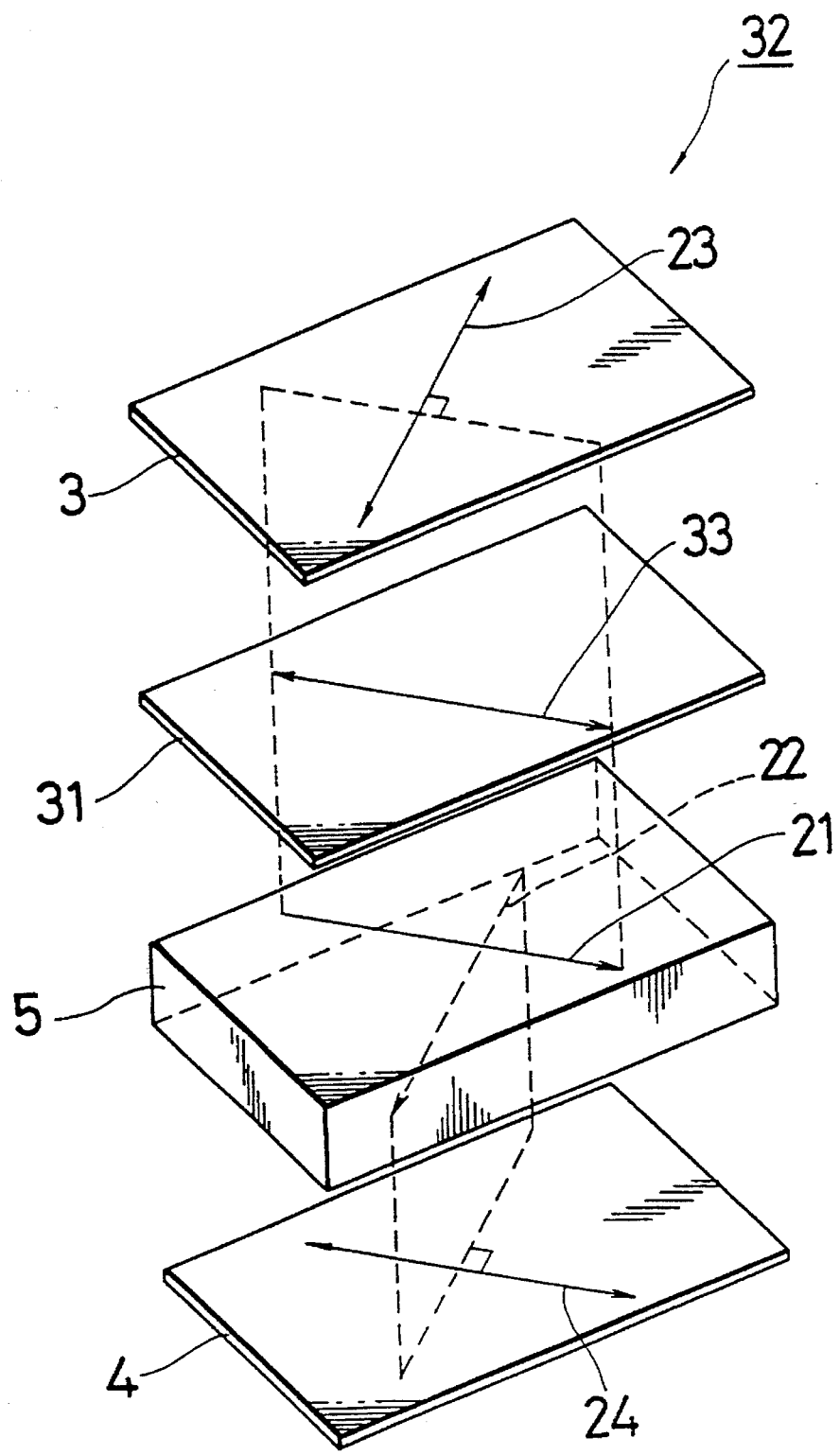
FIG. 8 is a perspective exploded view showing the constitution of a conventional liquid crystal display device 32 using the phase difference plate 31.

A liquid crystal display device 32 in FIG. 8 is similar in structure to the liquid crystal display device 2 in FIG. 2 except for the phase difference plate 1, and a nematic liquid crystal with the refractive index anisotropy Δn of 0.08 is used as the liquid crystal layer 12, and the thickness of the liquid crystal layer 12 is set at 4.5 μm, while a phase difference plate 31 shown in FIG. 7 is used instead of the phase difference plate 1 shown in FIG. 1. The phase difference plate 31 is manufactured by drawing elongation of a high polymer compound such as polycarbonate, being of uniaxial material of which value of first retardation (nc−na)xd is 0 nm, and value of second retardation (nc−nb)xd is −100 nm, and the direction of the principal refractive index nb is formed parallel to the normal direction of the surface.

Figure 9:
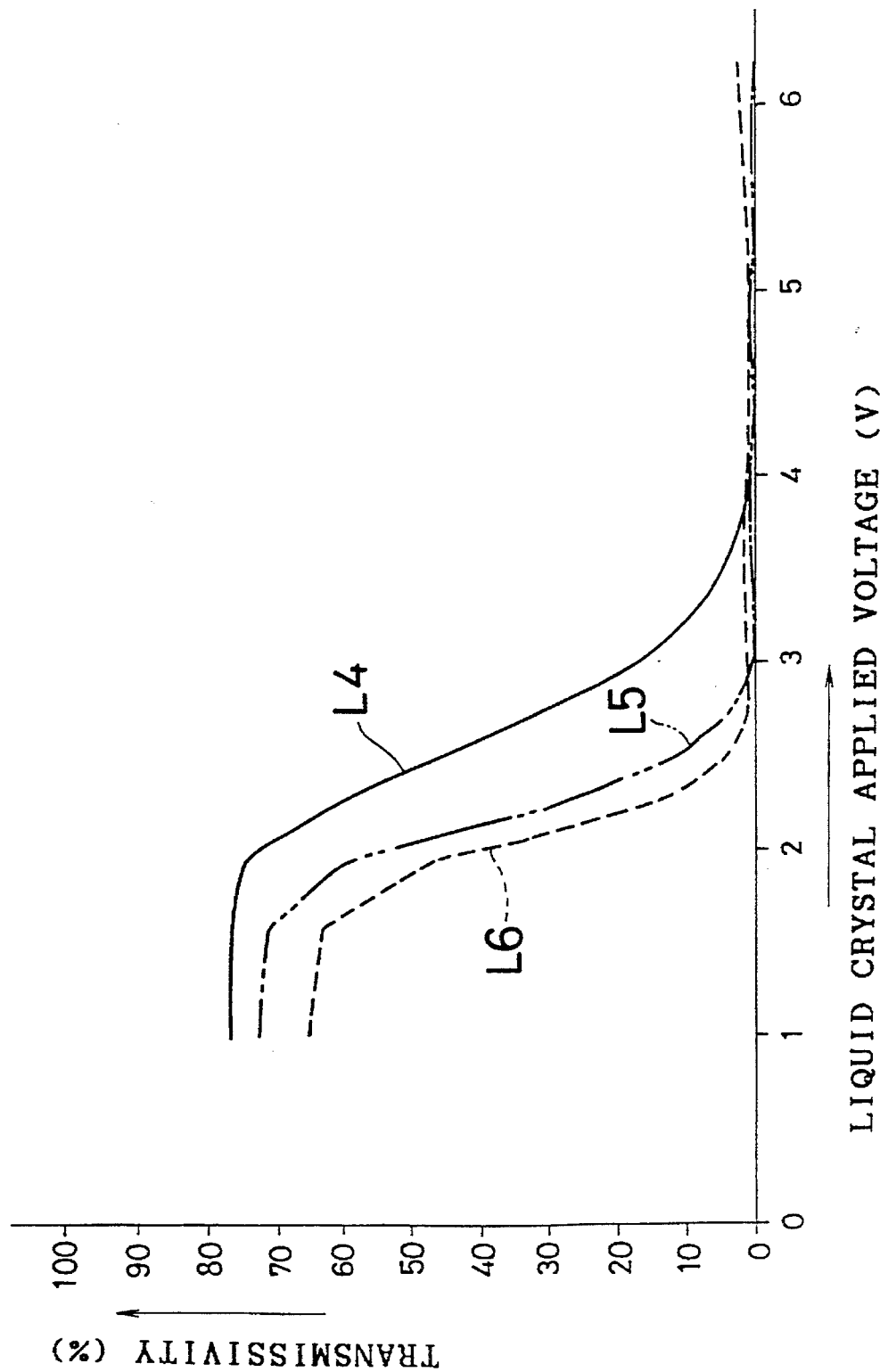
FIG. 9 is a graph showing the transmissivity-liquid crystal applied voltage characteristics of a liquid crystal display device 32 in Comparison 1.

Such liquid crystal display device 32 was installed in the measuring system shown in FIG. 5, same as in Example 1, and the photo detector 71 was fixed at a specific angle ψ, and the output level of the photo detector 71 to the liquid crystal applied voltage was measured, of which result is graphically shown in FIG. 9 as the transmissivity-liquid crystal applied voltage characteristics. In FIG. 9, line L4 refers to angle ψ=0 degree, line L5, 30 degrees, and line L6, 45 degrees. As known from the results, as the liquid crystal applied voltage is gradually raised from zero vol, the transmissivity is lowered nearly to 0% around 3.2 V in line L5, and tends to rise slightly when the liquid crystal applied voltage is further raised, while the transmissivity climbs up again without completely reaching 0% in line L6. At the liquid crystal applied voltage of about 1 V, the transmissivity is lowered as the angle ψ increases from 0 degree. Therefore, it is understood that the dependence on viewing angle is improved considerably in Example 1 as compared with Comparison 1.

EXAMPLE 2

In the liquid crystal display device 2 in FIG. 2, using a nematic liquid crystal material having the refractive index anisotropy Δn of 0.08 as the liquid crystal layer 12, the thickness of the liquid crystal layer 12 was set at 4.5 μm, and the high polymer compound such as polycarbonate and polyester is drawn and elongated as the phase difference plate 1, being of biaxial material with the first retardation (nc−na)xd of 220 nm and second retardation (nc−nb)xd of 35 nm, in which the direction of the principal refractive index nb is inclined 40 degrees clockwise in the opposite direction of the arrow 20 in FIG. 1 to the normal direction of the surface of the phase difference plate 1, and the direction of the principal refractive index nc is at an angle of 40 degrees clockwise to the surface.

Figure 10:
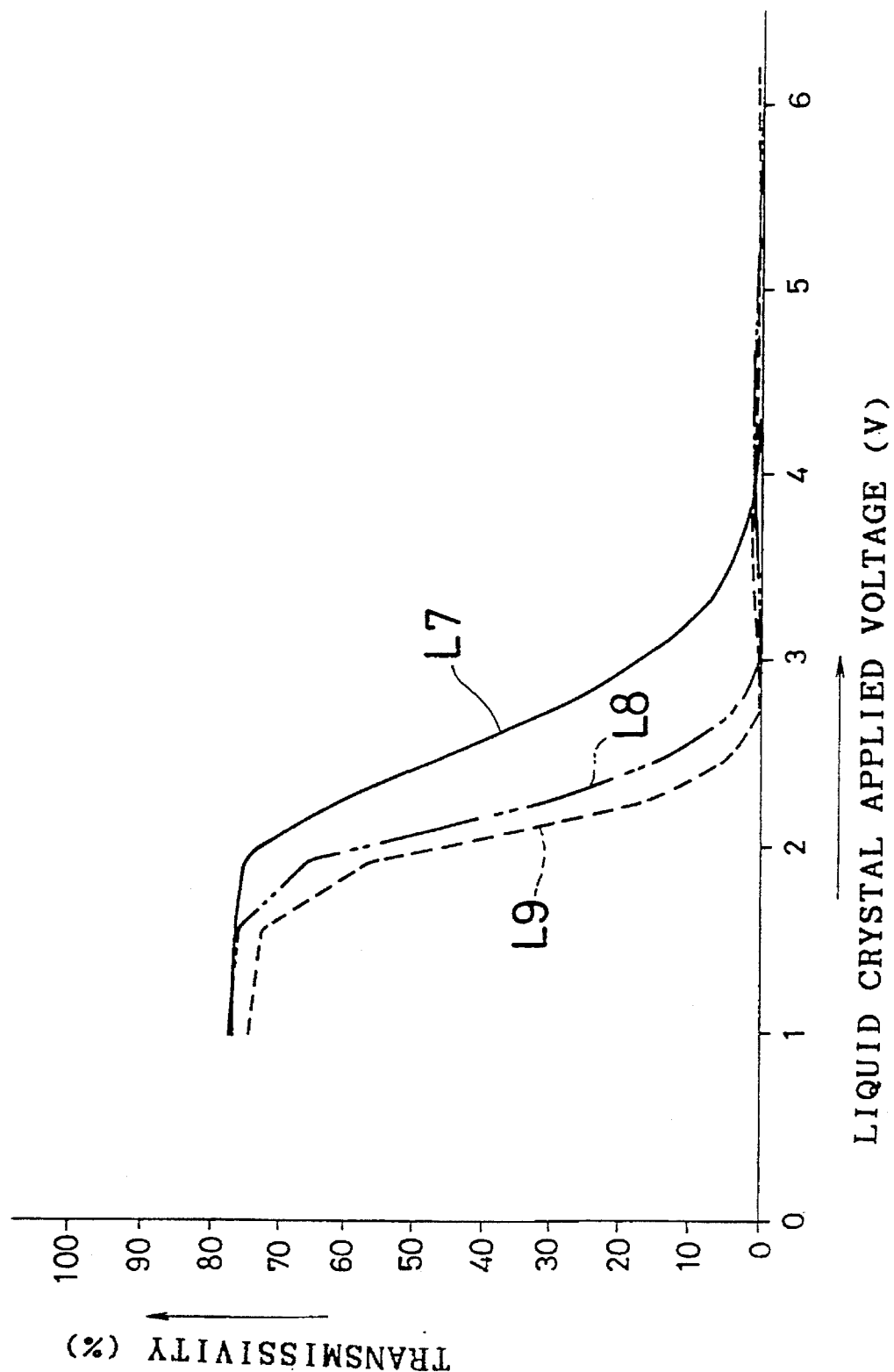
FIG. 10 is a graph showing the transmissivity-liquid crystal applied voltage characteristics of a liquid crystal display device 2 in Example 2.

Such liquid crystal display device 2 was installed in the measuring system shown in FIG. 5, and the photo detector 71 was fixed at a specific angle ψ, and the output level of the photo detector 71 to the liquid crystal applied voltage to the liquid crystal display cell 5 was measured, of which result is graphically shown in FIG. 10 as the transmissivity-liquid crystal applied voltage characteristics. In FIG. 10, line L7 refers to the angle ψ of 0 degree, line L8, 30 degrees, and line L9, 45 degrees. As the liquid crystal applied voltage was gradually raised from zero volt, the transmissivity dropped to 0% up to around 4.5 V, and if the liquid crystal applied voltage was further raised, the transmissivity was not elevated again. At the liquid crystal applied voltage of about 1 V, there transmissivity was not so different among lines L7, L8, and L9, and it is understood that the dependence on viewing angle was improved.

Comparison 2

The liquid crystal display device 32 shown in FIG. 8 is similar in structure to the liquid crystal display device 2 in FIG. 2 except for the phase difference plate 1, and the liquid crystal layer 12 is a nematic liquid crystal layer with the refractive index anisotropy Δn of 0.08, the thickness of the liquid crystal layer 12 is set at 4.5 μm, and a phase difference plate 31 shown in FIG. 7 is used instead of the phase difference plate 1 shown in FIG. 1. The phase difference plate 31 is a drawn and elongated high polymer compound such as polycarbonate, being of biaxial material with the first retardation (nc−na)xd of 220 nm and second retardation (nc−nb)xd of 35 nm, and the direction of the principal refractive index nb is formed parallel to the normal direction of the surface.

Figure 11:
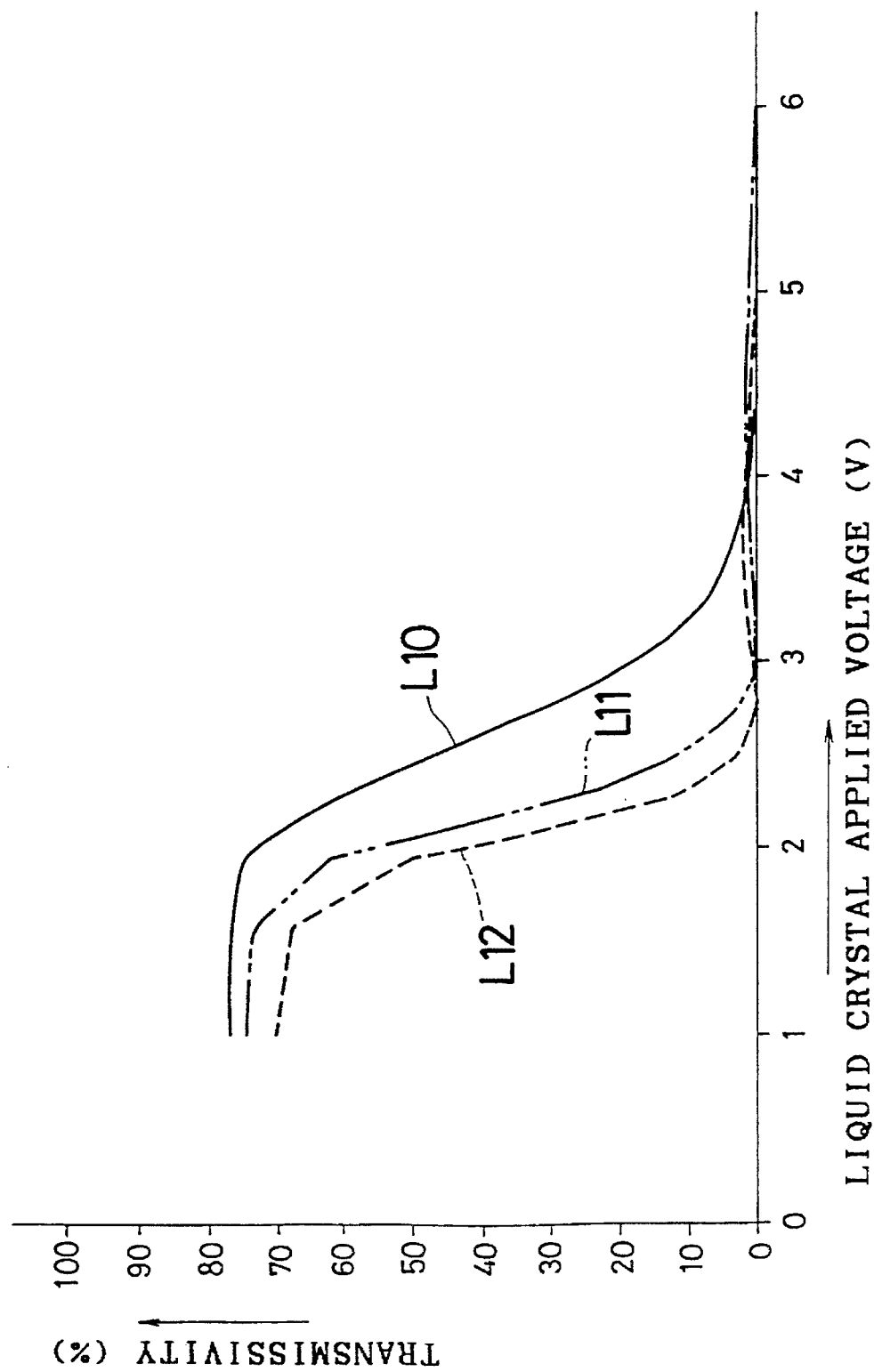
FIG. 11 is a graph showing the transmissivity-liquid crystal applied voltage characteristics of a liquid crystal display device 32 in Comparison 2.

Such liquid crystal display device 32 was installed in the measuring system shown in FIG. 5 same as in Example 2, and the photo detector 71 was fixed at a specific angle ψ, and the output level of the photo detector 71 to the liquid crystal applied voltage was measured, of which result is graphically shown in FIG. 11 as transmissivity-liquid crystal applied voltage characteristics. In FIG. 11, line L10 refers to the angle ψ of 0 degree, line 11, 30 degrees, and line 12, 45 degrees. As the liquid crystal applied voltage was raised gradually from zero volt, the transmissivity was lowered nearly to 0% around 2.9 V in line L11, and as the liquid crystal applied voltage was further raised, it tended to elevate slightly, and in line L12, the transmissivity was nearly 0% around 2.8 V, and climbed up again by further raising. At the liquid crystal applied voltage of around 1 V, the transmissivity was lowered as the angle ψ became larger than 0 degree. In Example 2, therefore, it is understood that the dependence on viewing angle was considerably improved as compared with this Comparison 2.

EXAMPLE 3

Figure 12:
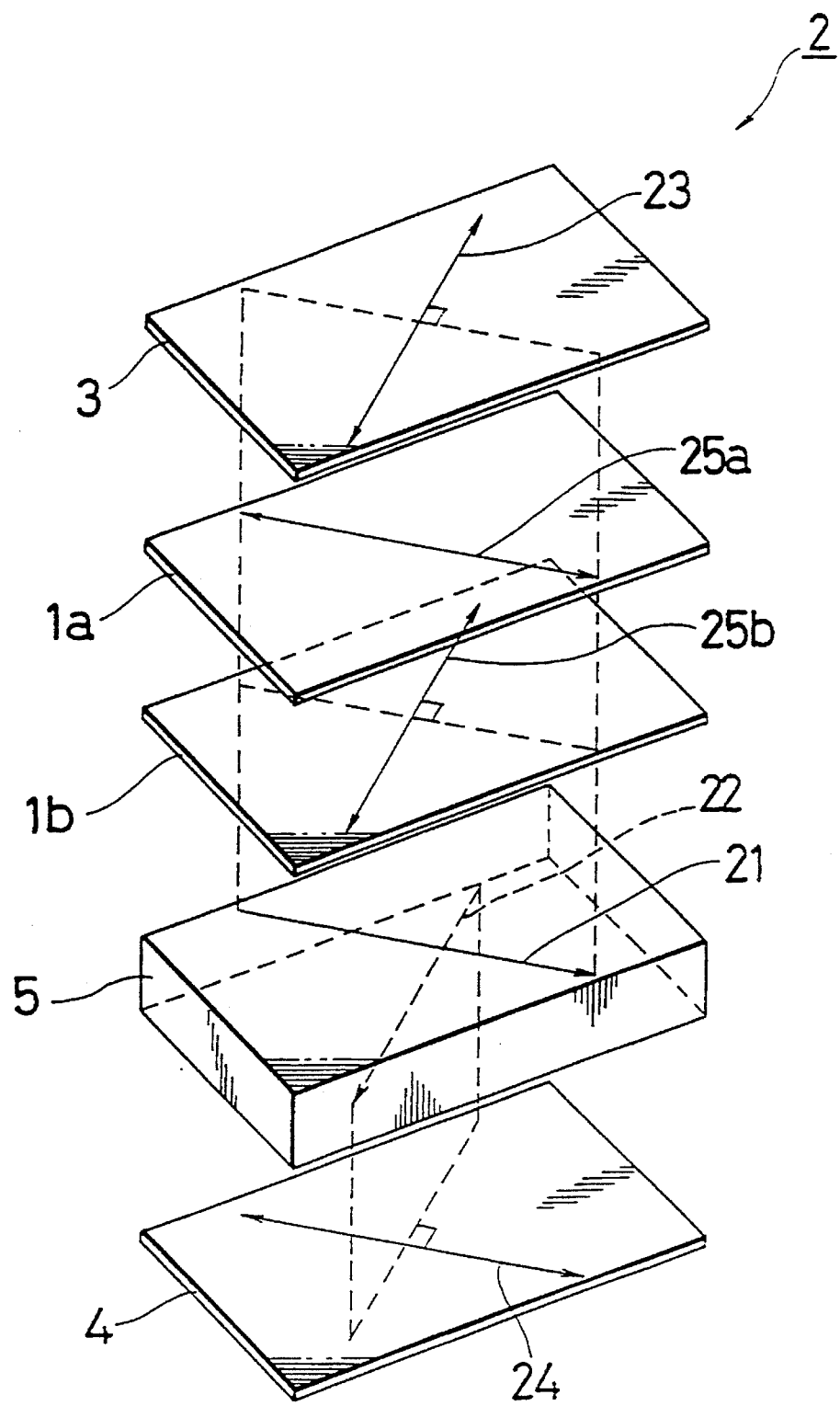
FIG. 12 is a perspective exploded view showing the constitution of a liquid crystal display device 2 in Example 3.

In the liquid crystal display device 2 in FIG. 12, using a nematic liquid crystal material having the refractive index anisotropy Δn of 0.08 as the liquid crystal layer 12, the thickness of the liquid crystal layer 12 was set at 4.5 μm, and the high polymer compound such as polycarbonate and polyester was drawn and elongated as two phase difference plates 1a and 1b interposed between the liquid crystal display cell 5 and polarizers 3, the phase difference plate 1a being of biaxial material with the first retardation (nc−na)xd of 350 nm and second retardation (nc−nb)xd of 210 nm, in which the direction of the principal refractive index nb is inclined 20 degrees clockwise in the opposite direction of the arrow 20 in FIG. 1 to the normal direction of the surface of the phase difference plate 1, and the direction of the principal refractive index nc is at an angle of 20 degrees clockwise to the surface. Moreover, the direction (fast direction) 25a of the minimum principal refractive index na is arranged to be parallel to the rubbing direction 21 of the orientation film 10 on the glass substrate 6.

On the other hand, the phase difference plate 1b is, similar to the phase difference plate 1a, a drawn and elongated high polymer compound such as polycarbonate and polyester, being of biaxial material with the first retardation (nc−na)xd of 350 nm and second retardation (nc−nb)xd of 210 nm, in which the direction of the principal refractive index nb is inclined 20 degrees counterclockwise indicated by the arrow 20 in FIG. 1 to the normal direction of the surface of the phase difference plate 1, and the direction of the principal refractive index nc is at an angle of 20 degrees to the surface. Moreover, the direction (fast direction) 25b of the minimum principal refractive index na is arranged to be vertical to the rubbing direction 21 of the orientation film 10 on the glass substrate 6.

Figure 13:
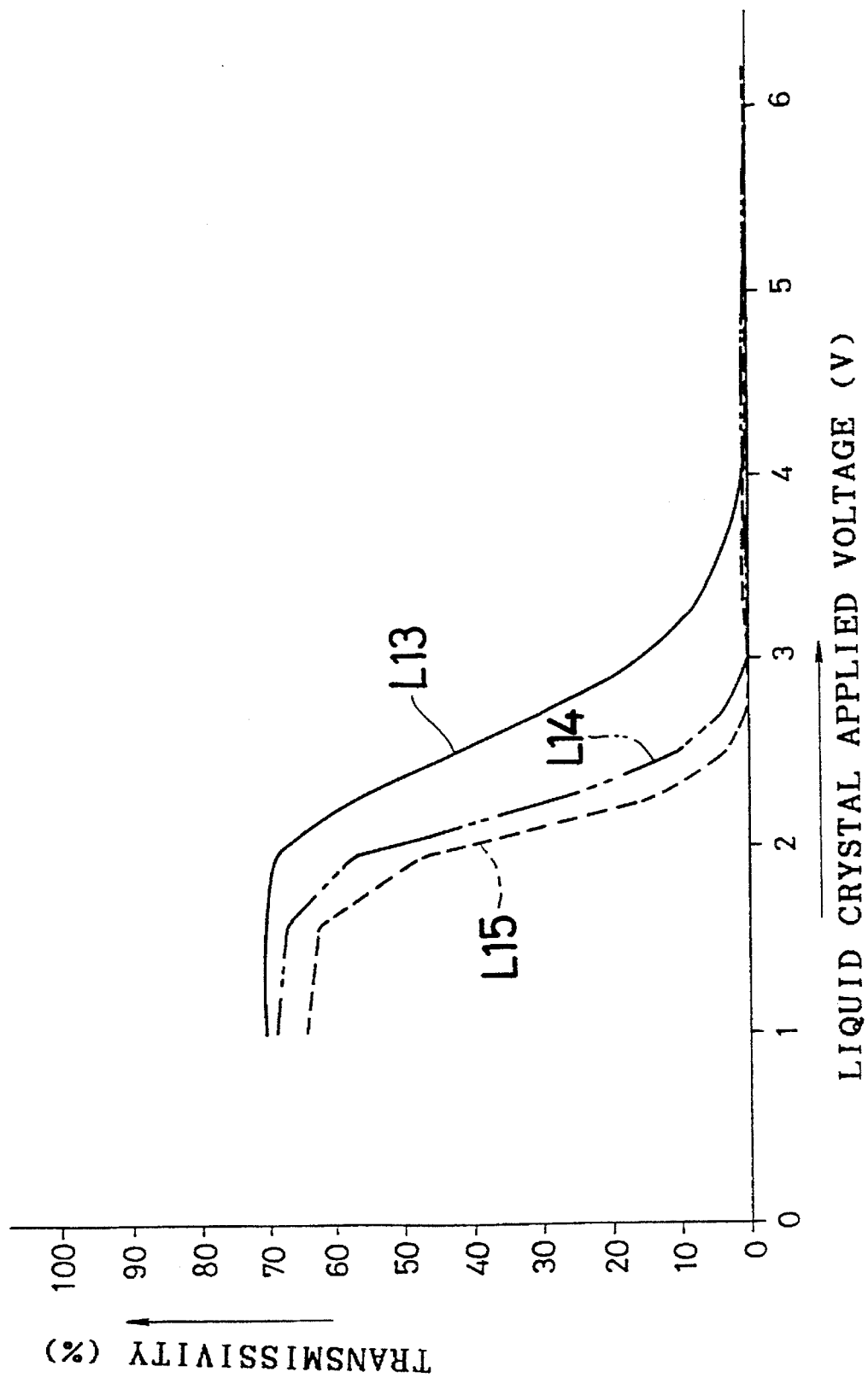
FIG. 13 is a graph showing the transmissivity-liquid crystal applied voltage characteristics of the liquid crystal display device 2 in Example 3.

Such liquid crystal display device 2 was installed in the measuring system shown in FIG. 5, and the photo detector 71 was fixed at a specific angle ψ, and the output level of the photo detector 71 to the liquid crystal applied voltage to the liquid crystal display cell 5 was measured, of which result is graphically shown in FIG. 13 as the transmissivity-liquid crystal applied voltage characteristics. In FIG. 13, line L13 refers to the angle ψ of 0 degree, line L14, 30 degrees, and line L15, 45 degrees. As the liquid crystal applied voltage was gradually raised from zero volt, the transmissivity dropped to 0% up to around 4.5 V, and if the liquid crystal applied voltage was further raised, the transmissivity was not elevated again. At the liquid crystal applied voltage of about 1 V, there transmissivity was not so different among lines L13, L14, and L15, and it is understood that the dependence on viewing angle was improved.

Comparison 3

Figure 14:
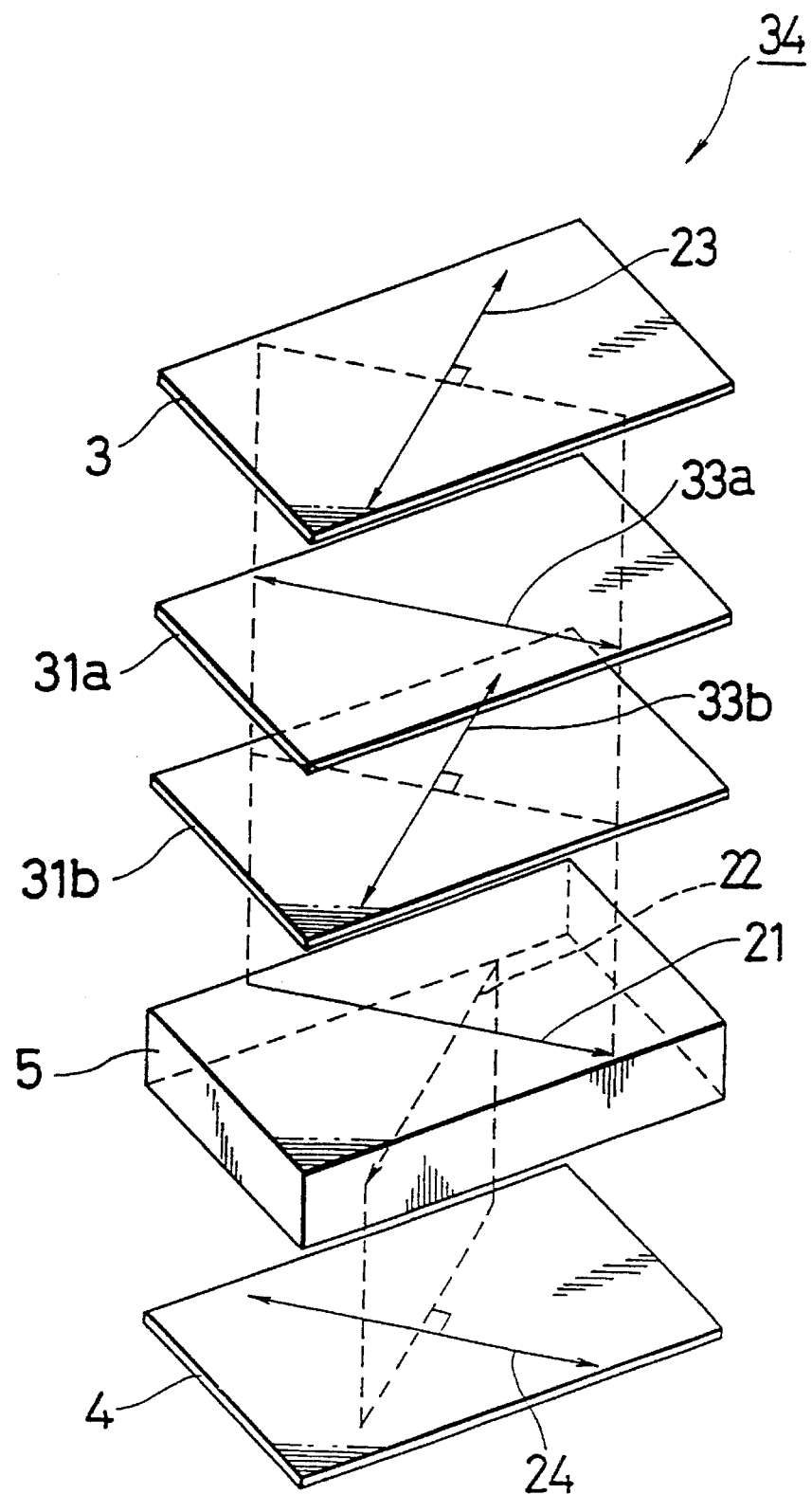
FIG. 14 is a perspective exploded view showing the constitution of a liquid crystal display device 51 using conventional phase difference plates 31a, 31b.

In this comparison, the liquid crystal display device 34 shown in FIG. 14 is similar in structure to the liquid crystal display device 2 in FIG. 12 except for the phase difference plates 1a and 1b, and the liquid crystal layer 12 is a nematic liquid crystal layer with the refractive index anisotropy Δn of 0.08, the thickness of the liquid crystal layer 12 is set at 4.5 μm, and a phase difference plate 31 shown in FIG. 7 is used as the phase difference plates 1a and 1b instead of the phase difference plate 1 shown in FIG. 1. The phase difference plate 31a is a drawn and elongated high polymer compound such as polycarbonate, being of biaxial material with the first retardation (nc−na)xd of 350 nm and second retardation (nc−nb)xd of 210 nm, and the direction of the principal refractive index nb is formed parallel to the normal direction of the surface. Moreover, the direction (fast direction) 33a of the minimum principal refractive index na is arranged to be parallel to the rubbing direction 21 of the orientation film 10 on the glass substrate 6.

On the other hand, the phase difference plate 31b is, similar to the phase difference plate 31a, a drawn and elongated high polymer compound such as polycarbonate, being of biaxial material with the first retardation (nc−na)xd of 350 nm and second retardation (nc−nb)xd of 210 nm, and the direction of the principal refractive index nb is formed parallel to the normal direction of the surface. Moreover, the direction (fast direction) 33b of the minimum principal refractive index na is arranged to be vertical to the rubbing direction 21 of the orientation film 10 on the glass substrate 6.

Figure 15:
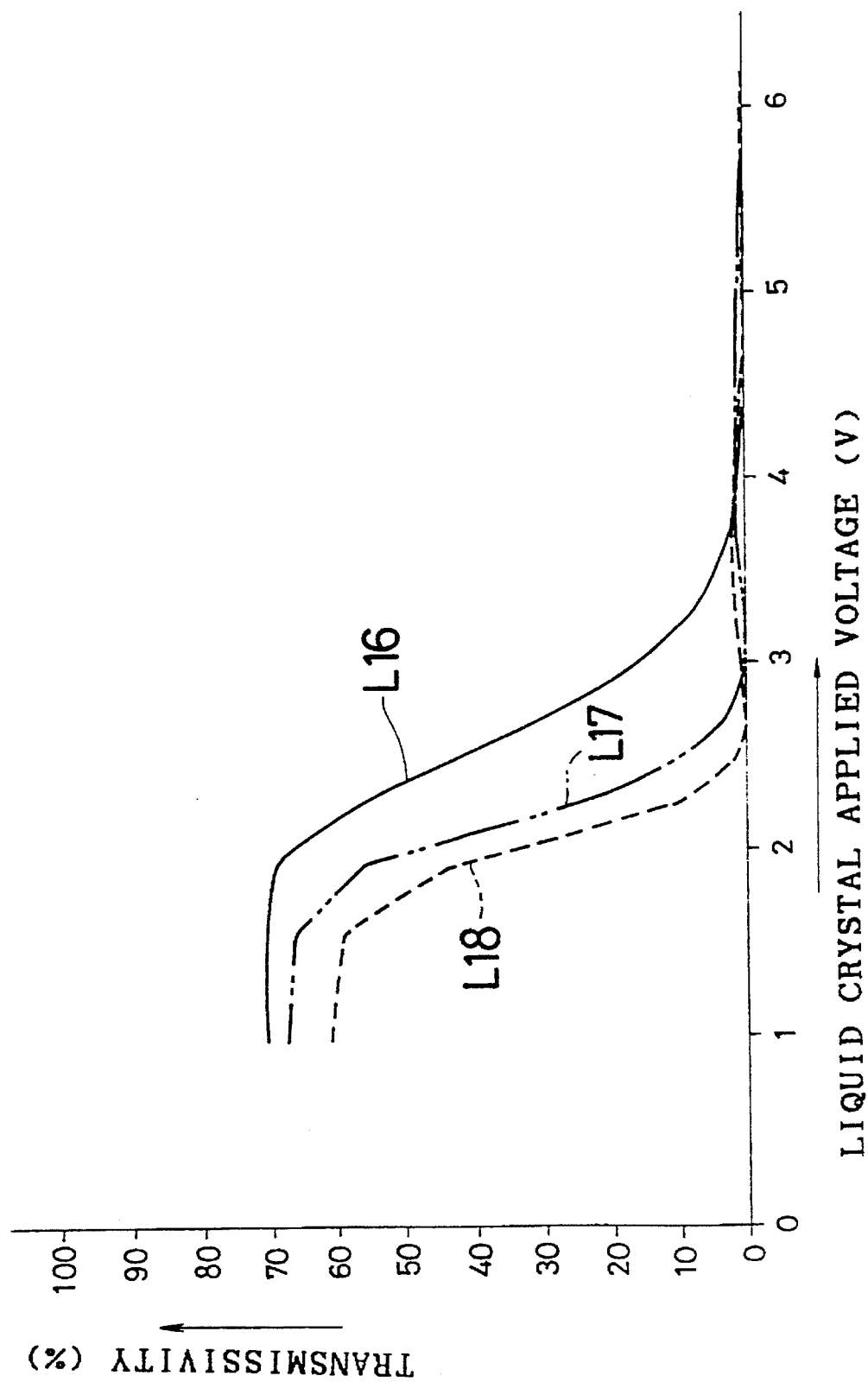
FIG. 15 is a graph showing the transmissivity-liquid crystal applied voltage characteristics of the liquid crystal display device 51 in Comparison 3.

Such liquid crystal display device 34 was installed in the measuring system shown in FIG. 5 same as in Example 2, and the photo detector 71 was fixed at a specific angle ψ, and the output level of the photo detector 71 to the liquid crystal applied voltage was measured, of which result is graphically shown in FIG. 15 as transmissivity-liquid crystal applied voltage characteristics. In FIG. 15, line L16 refers to the angle ψ of 0 degree, line 17, 30 degrees, and line 18, 45 degrees. As the liquid crystal applied voltage was raised gradually from zero volt, the transmissivity was lowered nearly to 0% around 4.5 V, and as the liquid crystal applied voltage was further raised, the transmissivity was elevated again, and the margin of elevation was larger than in Example 3. Furthermore, at the liquid crystal applied voltage of around 1 V, the transmissivity dropped as the angle ψ increased from 0 degree. As compared with this comparison, therefore, it is understood that the dependence on viewing angle was slightly improved in Example 3.

Incidentally, instead of the drawn and elongated high polymer compound explained in the foregoing embodiments, oblique orientation of liquid crystal high polymer such as polycarbonate and polyester may be also employed.

Figure 16:
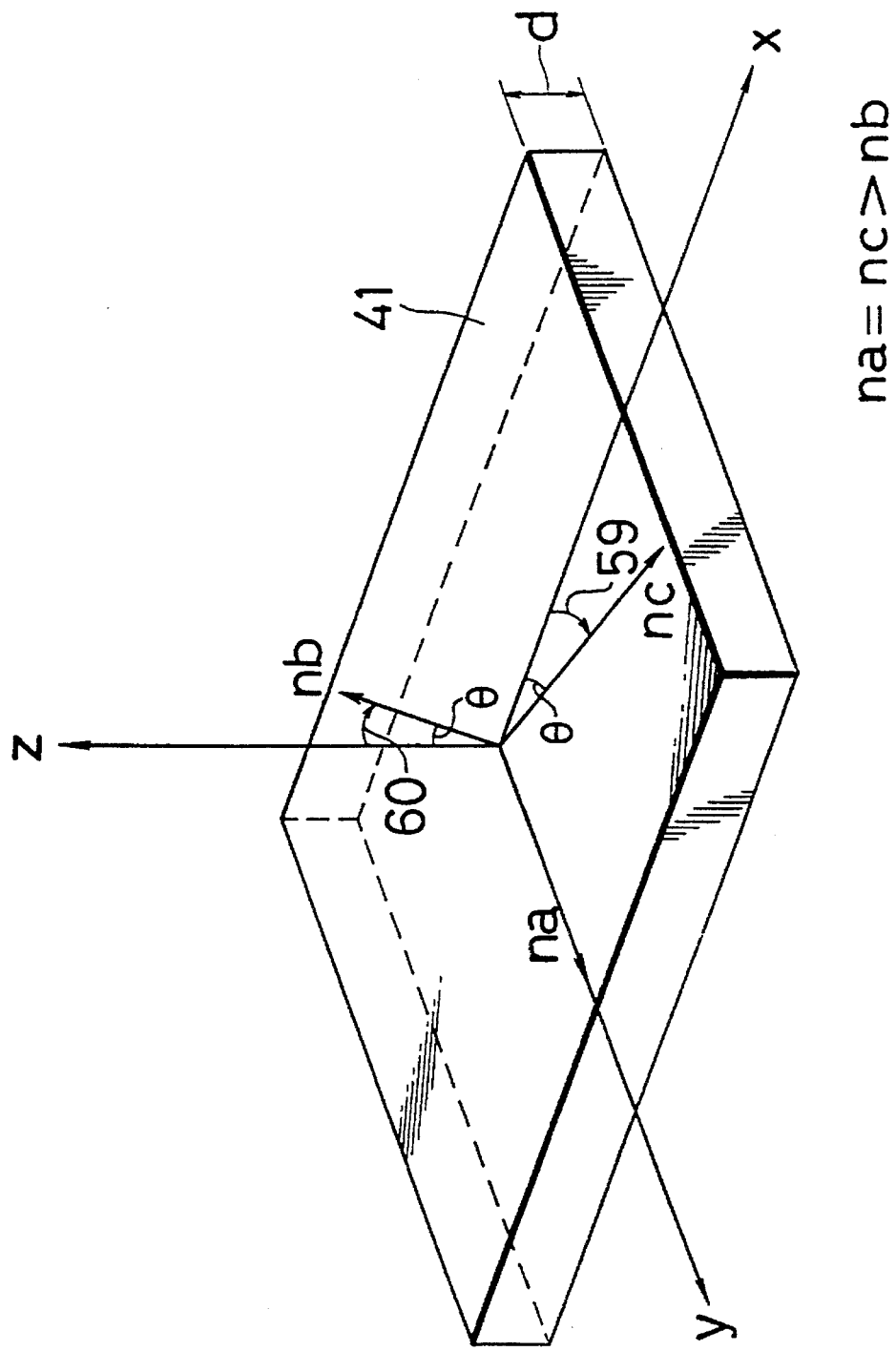
FIG. 16 is a perspective view of a phase difference plate 41 in other embodiment of the invention.

FIG. 16 is a perspective view of a phase difference plate in other embodiment of the invention. The phase difference plate 41 is a material having optical anisotropy, such as drawn and elongated high polymer compound including polystyrene, formed in a flat plate with the thickness of d, and defining the surface to be a system of rectangular coordinates xyz on plane x–y, the direction of the principal refractive index na, out of three principal refractive indices na, nb, nc of the index ellipsoid is parallel to the y-axis, and the direction of the principal refractive index nb is inclined in the direction of arrow 60 at an angle of θ about the y-axis to the normal direction (z-axis in FIG. 16) of the surface. The direction of the principal refractive index nc is inclined in the direction of arrow 59 at an angle of θ about the y-axis along the surface. Among the principal refractive indices na, nb, no, the relation of na=nc>nb is established.

Figure 17:
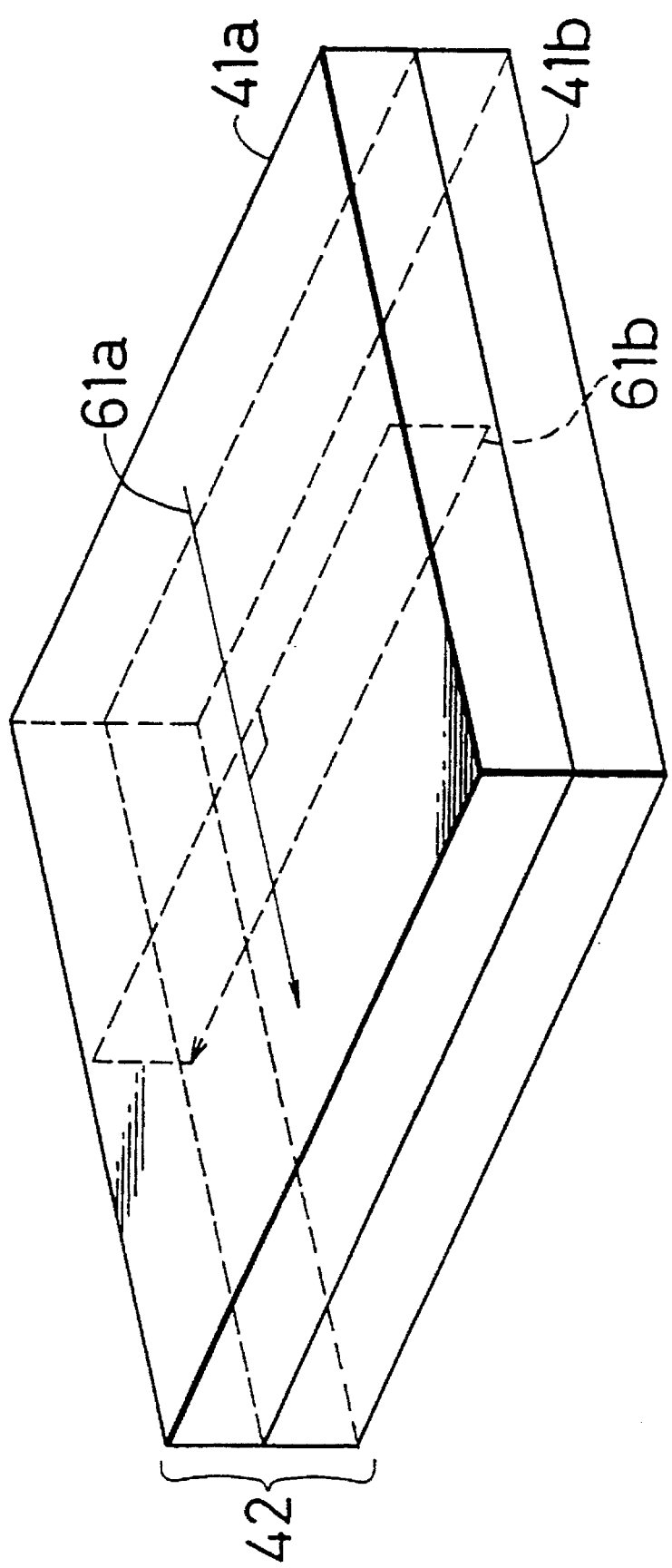
FIG. 17 is a perspective view of a phase difference plate 42 in a different embodiment of the invention.

FIG. 17 is a perspective view of a phase difference plate 42 in a different embodiment of the invention. The phase difference plate 42 is composed by stacking up two of the phase difference plate 41 shown in FIG. 16. That is, the phase difference plate 42 forms an angle of about 90 degrees between the inclination direction 61a of the principal refractive index nb of the first phase difference plate 41a and the inclination direction 61b of the principal refractive index nb of the second phase difference plate 41b.

Figure 18:
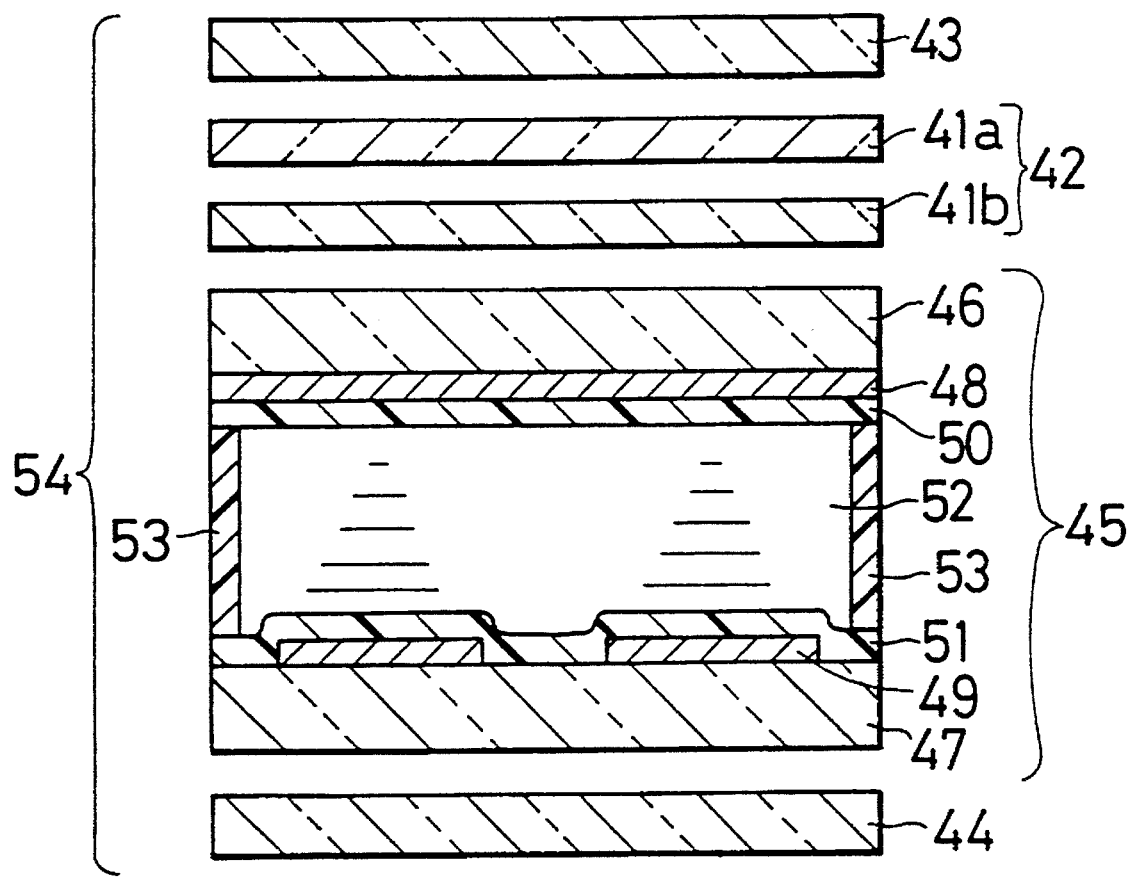
FIG. 18 is a sectional exploded view of a liquid crystal display device 54 is another embodiment of the invention.

FIG. 18 is a sectional exploded view of a liquid crystal display device 54 in a further different embodiment of the invention. The liquid crystal display device 54 comprises a liquid crystal display cell 45 composed by placing a liquid crystal layer 52 made of nematic liquid crystal between a pair of glass substrates 46, 47 forming transparent electrode layers 48, 49 made of ITO or the like and orientation films 50, 51 made of polyimide, polyvinyl alcohol or the like on the surface, by sealing with a sealing member 53, a pair of polarizers 43, 44 disposed at both sides of the liquid crystal display cell 45, and a phase difference plate 42 shown in FIG. 17 interposed between the liquid crystal display cell 45 and polarizers 43, which are stacked up in the sequence shown in FIG. 18.

Figure 19:
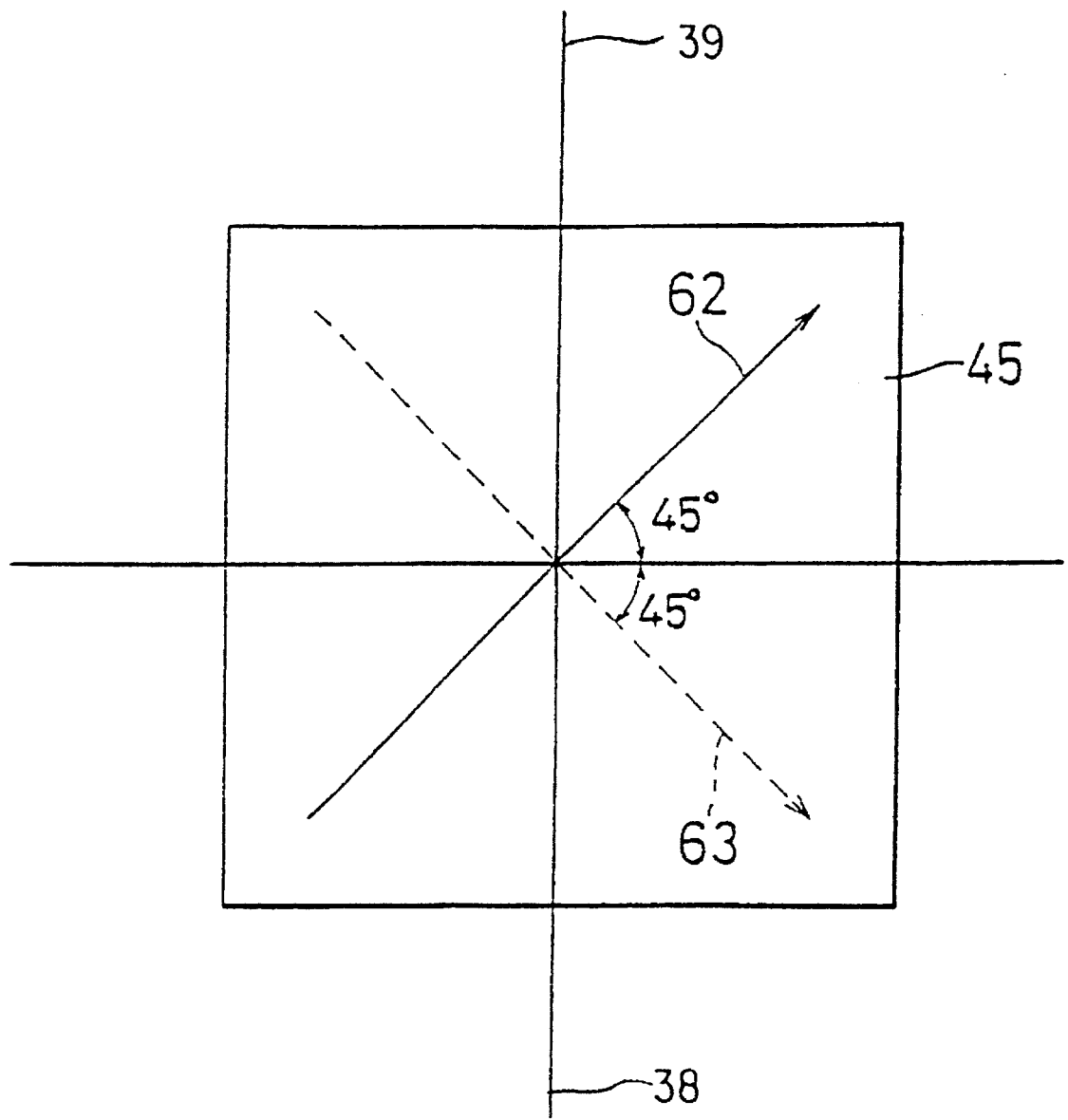
FIG. 19 is a plan showing the rubbing direction of a liquid crystal display device 45.

Each surface of the orientation films 50, 51 is pretreated by rubbing so as to twist the intervening liquid crystal molecules by about 90 degrees, and as shown in the plan in FIG. 19, the rubbing direction of the orientation film 50 on the glass substrate 46 is the direction of arrow 62, and the rubbing direction of the orientation film 51 on the glass substrate 47 is the direction of arrow 63 vertical to arrow 62.

Figure 20:
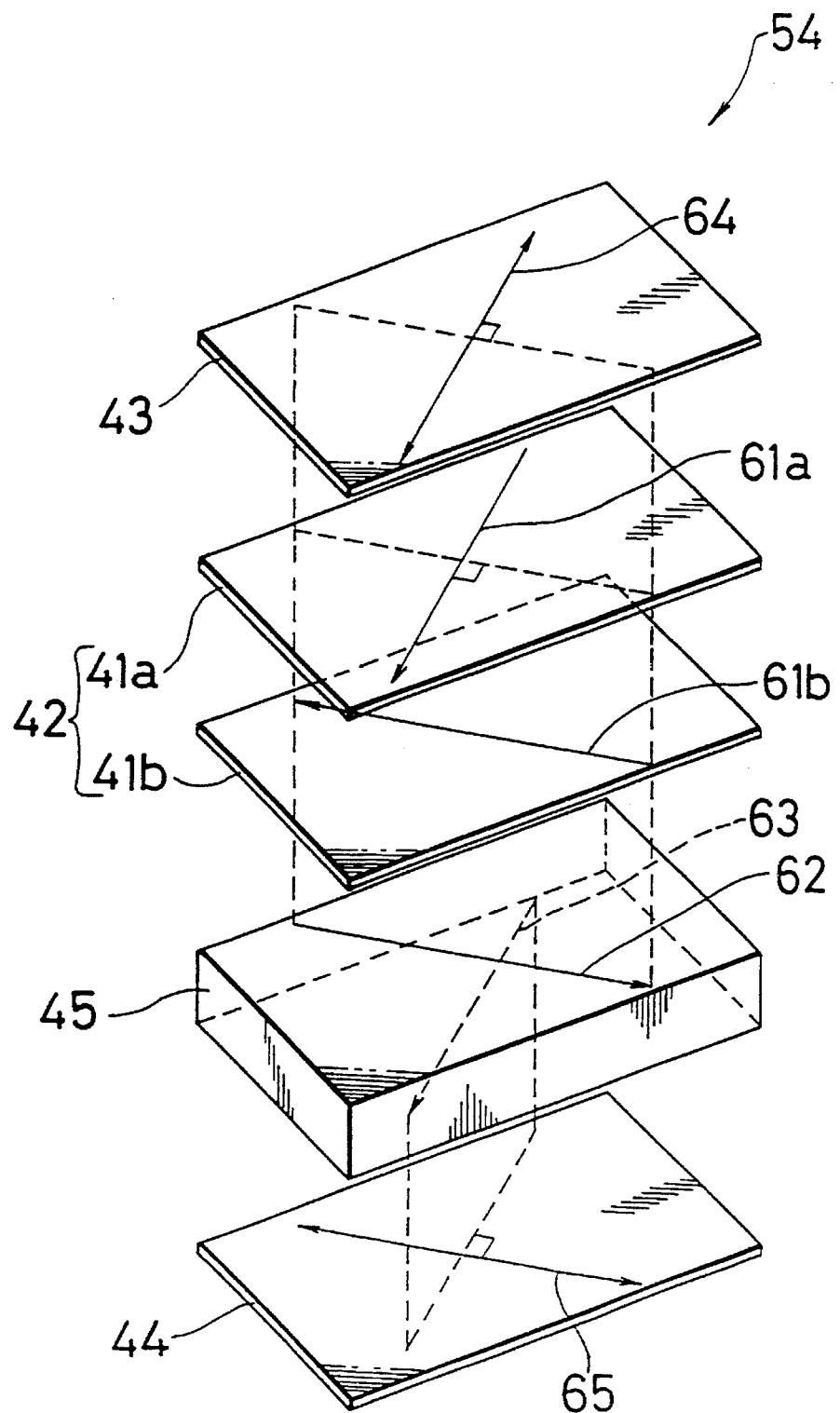
FIG. 20 is a perspective exploded view of the liquid crystal display device 54.

FIG. 20 is a perspective exploded view of the liquid crystal display device shown in FIG. 18. It is configured so that the transmission axis 64 of a polarizer 43 and the transmission axis 65 of a polarizer 44 may cross orthogonally to each other, and it is set so that the transmission axis 65 of the polarizer 44, the rubbing direction 62 of the orientation film 50 of the liquid crystal display cell 45, and the inclination direction 61b of the principal refractive index nb of the phase difference plate 41b may be parallel to each other, and that the rubbing direction 62 of the orientation film 50 of the liquid crystal display cell 45 and the inclination direction 61b of the principal refractive index nb of the phase difference plate 41b may be opposite to each other.

On the other hand, it is set so that the transmission axis 64 of the polarizer 43, rubbing direction 63 of the orientation film 51 of the liquid crystal display cell 45, and the inclination direction 61a of the principal refractive index nb of the phase difference plate 41a may be parallel to each other, and that the rubbing direction 63 of the orientation film 51 of the liquid crystal display cell 45 and the inclination direction 61a of the principal refractive index nb of the phase difference plate 41a may be in the same direction. Therefore, when voltage is not applied to the liquid crystal layer 52 of the liquid crystal display cell 45, the light transmits through the liquid crystal display device 54 to display white, thereby composing the so-called normally white display system. Phase compensation is possible as far as the phase difference plate 42 is placed either in the polarizer 43 or in the polarizer 44, and it may be interposed between the polarizer 44 and the liquid crystal display cell 45.

Figure 21:
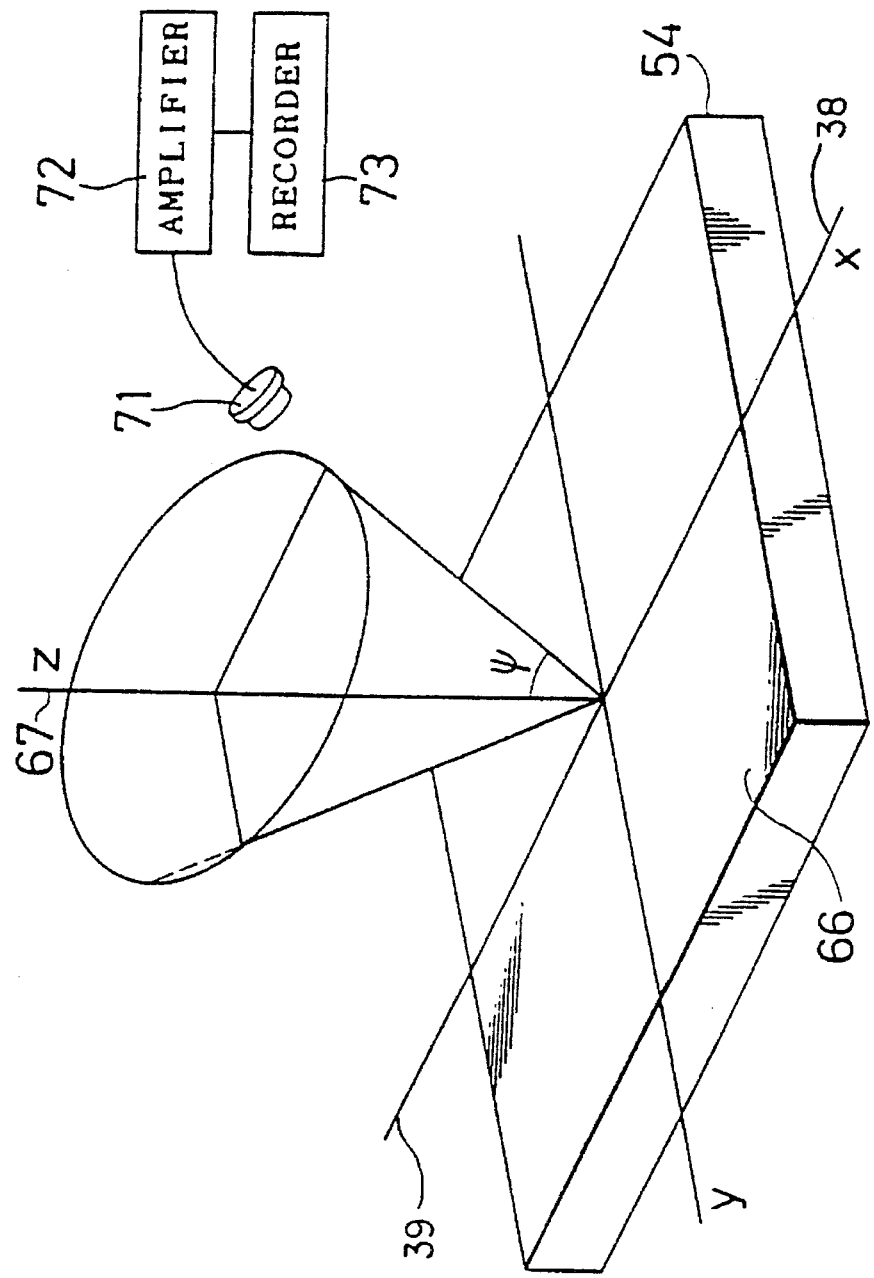
FIG. 21 is a schematic perspective view showing the measuring system of the dependence on viewing angle of the liquid crystal display device 54.

A practical embodiment of thus obtained liquid crystal display device 54 and the result of measurement of its dependence on viewing angle are explained. FIG. 21 is a schematic perspective view showing the measuring system of the dependence on viewing angle of the liquid crystal display device 54. The contact surface 66 of the glass substrate 46 of the liquid crystal display cell 45 for composing the liquid crystal display device 54 and the phase difference plate 41b is set on the reference plane x–y of the system of rectangular coordinates xyz, and the photo detector 71 having a specific incidental angle is placed same as in FIG. 5 at a position of a specific distance from the origin of the coordinates, in a direction of angle ψ to the normal direction 67 of the surface 66, and monochromatic color of wavelength 550 nm is entered from the polarizer 44 side. The output of the photo detector 71 is amplified to a specific level in an amplifier 72, and recorded by recording means 73 such as waveform memory and recorder. It is measured in four directions, normal viewing angle direction, right direction, anti-viewing angle direction, and left direction.

EXAMPLE 4

In the liquid crystal display device 54 in FIG. 18, using a nematic liquid crystal material of which refractive index anisotropy Δn is 0.08 as the liquid crystal layer 52, the thickness of the liquid crystal layer 52 is set at 4.5 μm, and a high polymer compound such as polystyrene is drawn and elongated as phase difference plates 41a, 41b for composing the phase difference plate 42, being, as shown in FIG. 16, a uniaxial material in which the value of the first retardation meaning the product (nc–na)xd of the difference between the principal refractive index nc and principal refractive index na and thickness d of phase difference plates 41a and 41b is 0 nm, and the value of the second retardation meaning the product (nc–nb)xd of the difference between the principal refractive index nc and principal refractive index nb and thickness d of phase difference plates 41a and 41b is 100 nm, and the direction of the principal refractive index nb is inclined 20 degrees clockwise indicated by arrow 60 to the normal line of the surface of the phase difference plates 41a and 41b, and similarly the direction of the principal refractive index nc forms an angle of 20 degrees to the surface.

Figure 22:
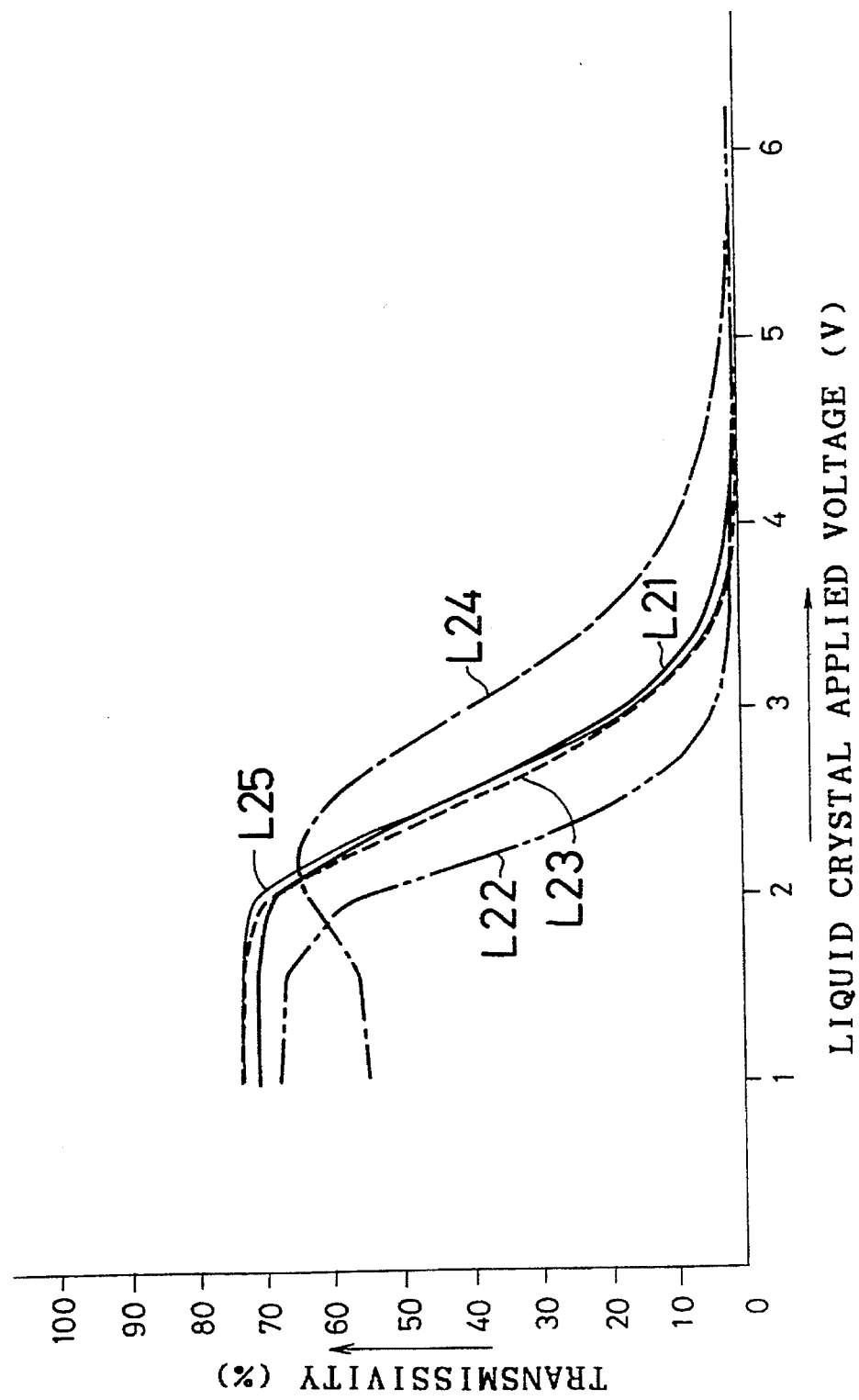
FIG. 22 is a graph showing the transmissivity-liquid crystal applied voltage characteristics of the liquid crystal display device 54 in Example 4.

Such liquid crystal display device 54 is installed in the measuring system shown in FIG. 21, and when the photo detector 71 is fixed at a specific angle ψ, the output level of the photo detector 71 to the applied voltage to the liquid crystal display cell 45 is measured, and the result is expressed as a graph of transmissivity-liquid crystal applied voltage characteristics in FIG. 22. In FIG. 22, line L21 refers to the characteristic curve at angle ψ =0 degree. The lines L22, L23, L24, and L25 represent the characteristic curves as seen at a position inclined by angle ψ of 30 degrees in the normal viewing angle direction, right direction, anti-viewing angle direction and left direction. It is understood from he findings hat he transmissivity is almost flat at the applied voltage of 3.5 V to 5.5 V. It is also known that the transmissivity when voltage is applied is not so different whether seen from above or inclined in the viewing angle.

Besides, in lines L23 and L25, it is almost same as the applied voltage-transmissivity characteristic as seen from above, and it is confirmed that the lateral asymmetricity is almost unchanged. Moreover, in line L24, the transmissivity when voltage is applied is considerably lowered, and black display is realized, which suggests ha the anti-viewing angle direction is improved.

The contrast ratio of the normal viewing angle direction and anti-viewing angle direction of the liquid crystal display device 54 is shown in Table 1 below.

TABLE 1

|  | Contrast ratio | |
| --- | --- | --- |
|  | Normal viewing angle direction | Anti-viewing angle direction |
| Liquid crystal display device 54 | 76 | 18 |
| Liquid crystal display device 80 | 10 | 8 |
| Without phase difference plate TN | 42 | 4 |

Comparison 4

Figure 23:
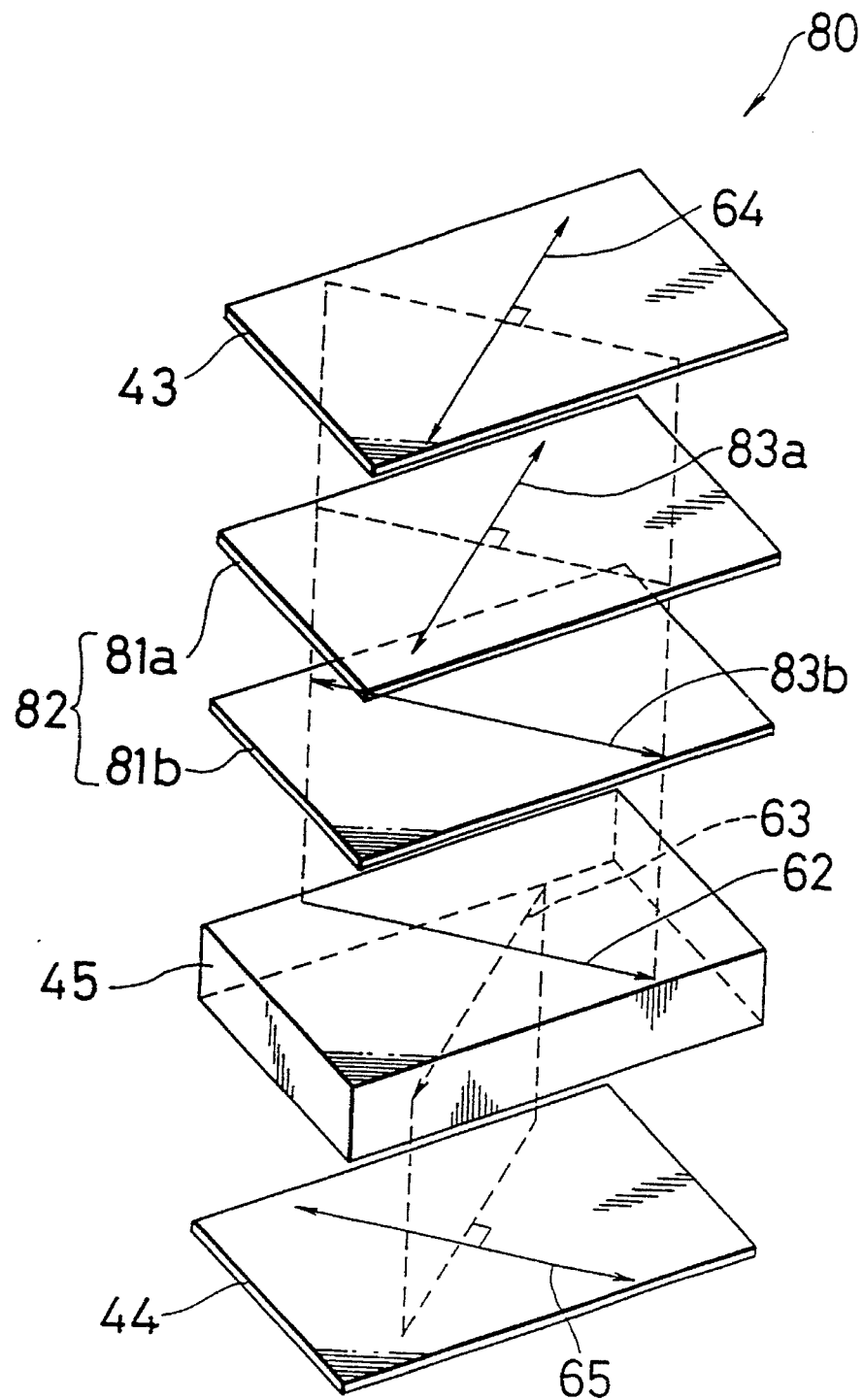
FIG. 23 is a perspective exploded view showing the constitution of a liquid crystal display device 80 in Comparison 4.
Figure 24:
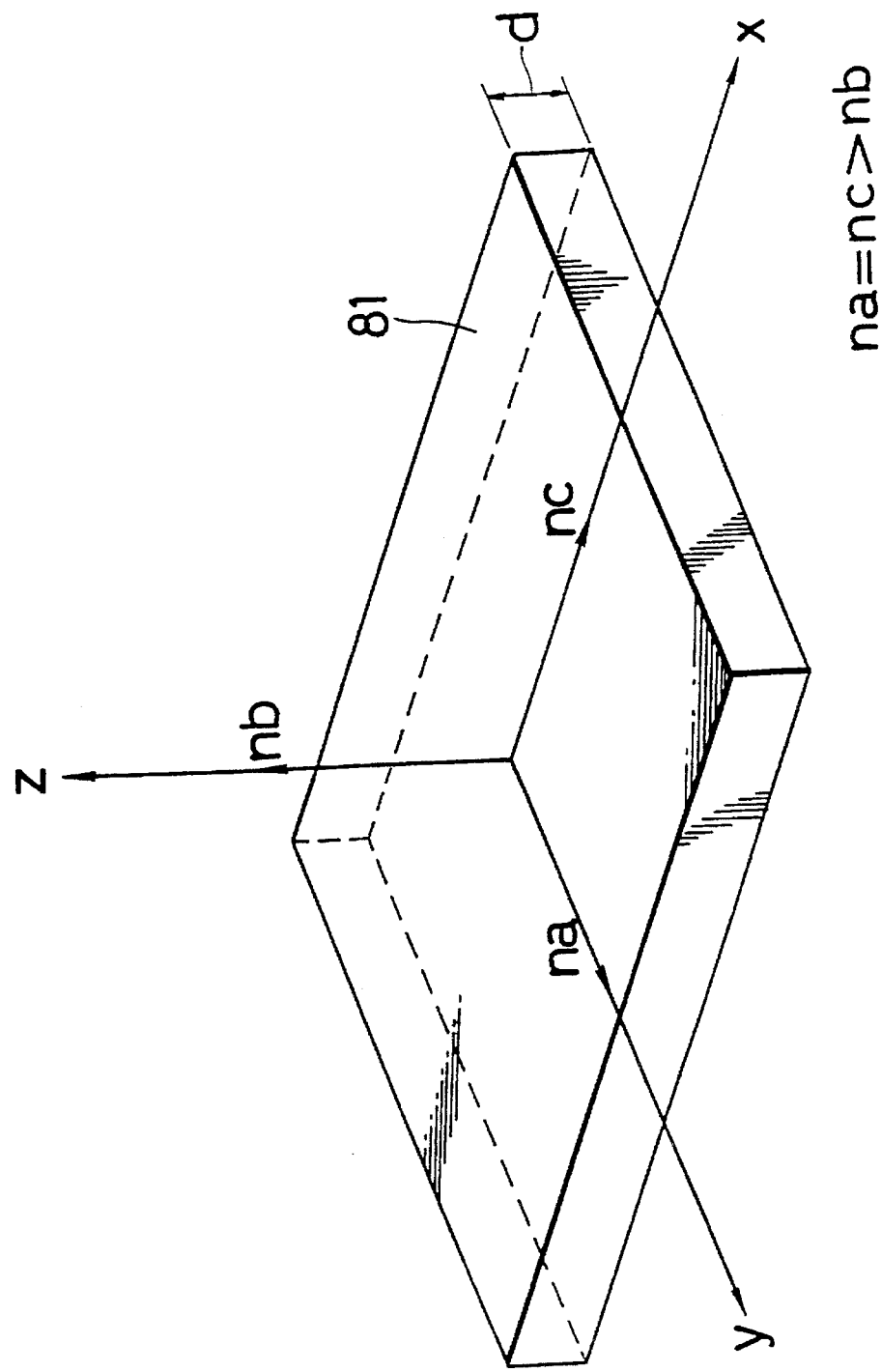
FIG. 24 is a perspective view showing the principal refractive indices na, nb, nc of a phase difference plate 81 used in the liquid crystal display device 80.

A liquid crystal display device 80 in FIG. 23 is similar in construction to the liquid crystal display device 54 in FIG. 18 except for the phase difference plate 82, and a nematic liquid crystal material with the refractive index anisotropy Δn of 0.08 is used as the liquid crystal layer 52, the thickness of the liquid crystal layer 52 is set at 4.5 μm, and a phase difference plate 81 shown in FIG. 24 is used instead of the phase difference plate 41 shown in FIG. 16. Phase difference plates 81a and 81b for composing the phase difference plate 82 are a drawn and elongated high polymer compound such as polystyrene, being of a uniaxial material with the first retardation (nc–na)xd of 0 nm and second retardation (nc–nb)xd of 100 nm, and the direction of the principal refractive index nb is formed parallel to the normal line of the surface.

It is configured so that the direction 83a of the principal refractive index nc of the first phase difference plate 81a may be parallel to the rubbing direction of the orientation film 51 on the glass substrate 47, and that the direction 83c of the principal refractive index nc of the second phase difference plate 81b may be parallel to the rubbing direction 62 of the orientation film 50 on the glass substrate 46.

Figure 25:
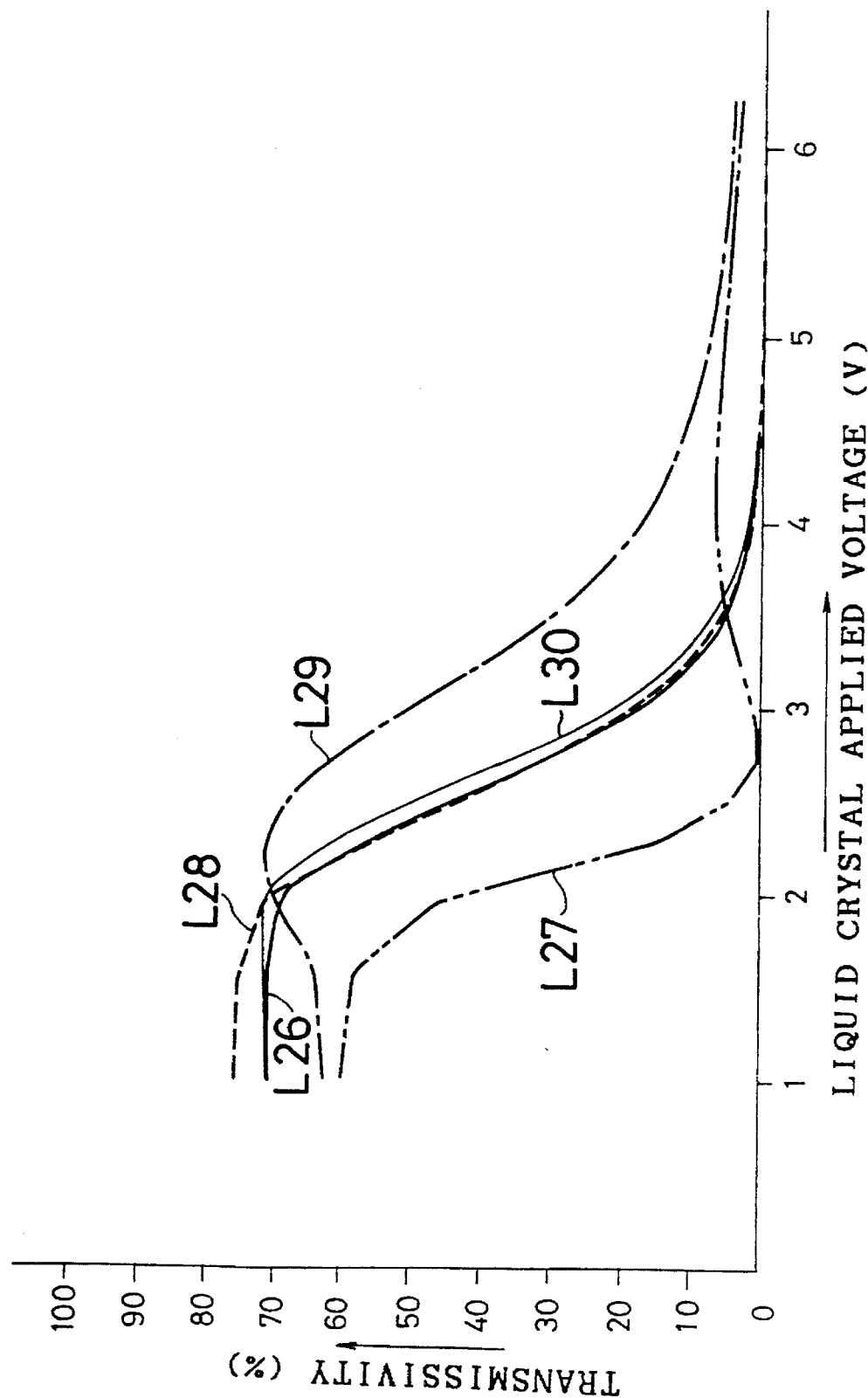
FIG. 25 is a graph showing the transmissivity-liquid crystal applied voltage characteristics of the liquid crystal display device 80 in Comparison 4.

FIG. 25 is a graph showing the applied voltage-transmissivity characteristics of the liquid-crystal display device 80. In FIG. 25, the characteristic curve as observing the liquid crystal display device 80 from above is represented by line L26, and the characteristic curves as seen from the position inclined by angle ψ of 30 degrees in the normal viewing angle direction, right direction, anti-viewing angle direction, and left direction are indicated by lines L27, L28, L29, and L30, respectively. In line L27 in FIG. 25, the transmissivity once lowered at applied voltage of 2.7 was raised again from 3.0 V, and reversal phenomenon was observed. In addition, it was known that the transmissivity when voltage was applied was lowered when the viewing angle was inclined. Besides, lines L28 and L30 were found to be slightly asymmetrical laterally as compared with lines L23, L25 in FIG. 22. Furthermore, in line L29, the transmissivity with voltage applied was not fully lowered.

Therefore, the viewing angle characteristic of the liquid crystal display device 54 shown in FIG. 18 is found to be considerably improved as compared with the viewing angle characteristics of the conventional liquid crystal display device 80 shown in FIG. 23. As the phase difference plate 41, meanwhile, oblique orientation of liquid crystal high polymer or rolling of high polymer film may be employed. Rolling means to pass a film between upper and lower rollers.

EXAMPLE 5

Figure 26:
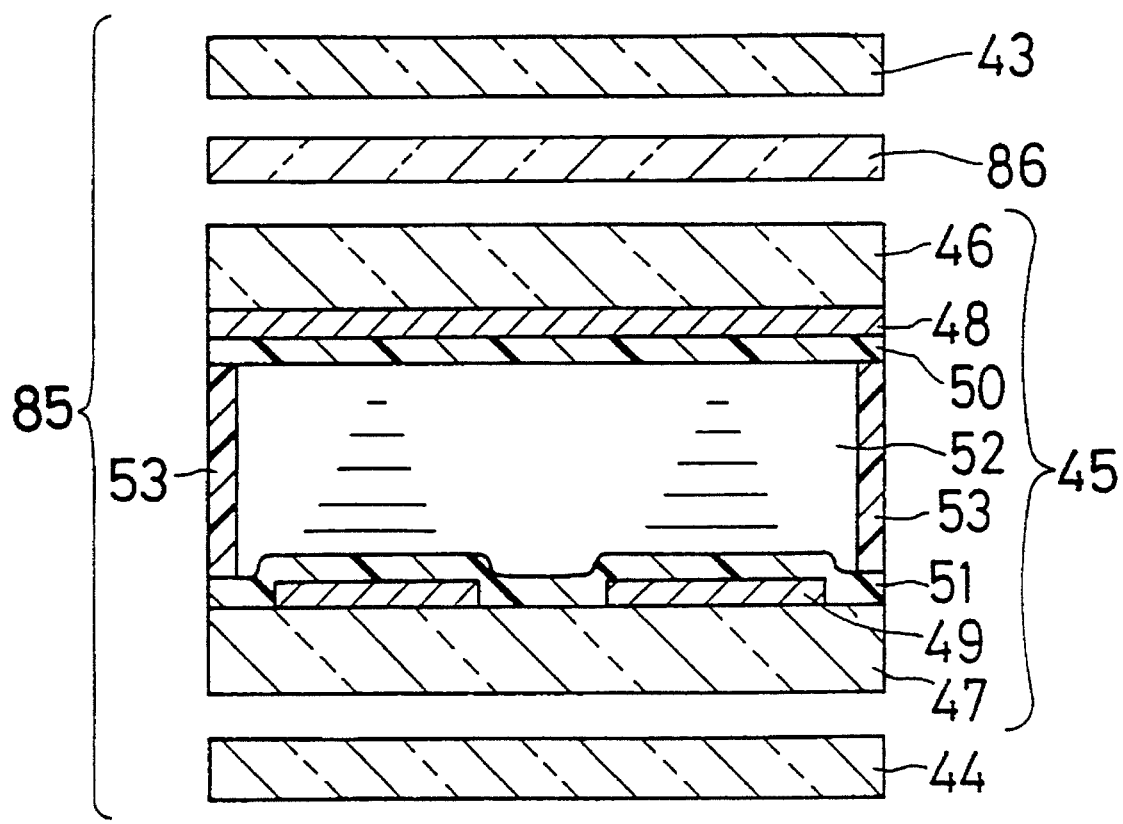
FIG. 26 is a sectional exploded view showing the constitution of a liquid crystal display device 85 in Example 5.
Figure 27:
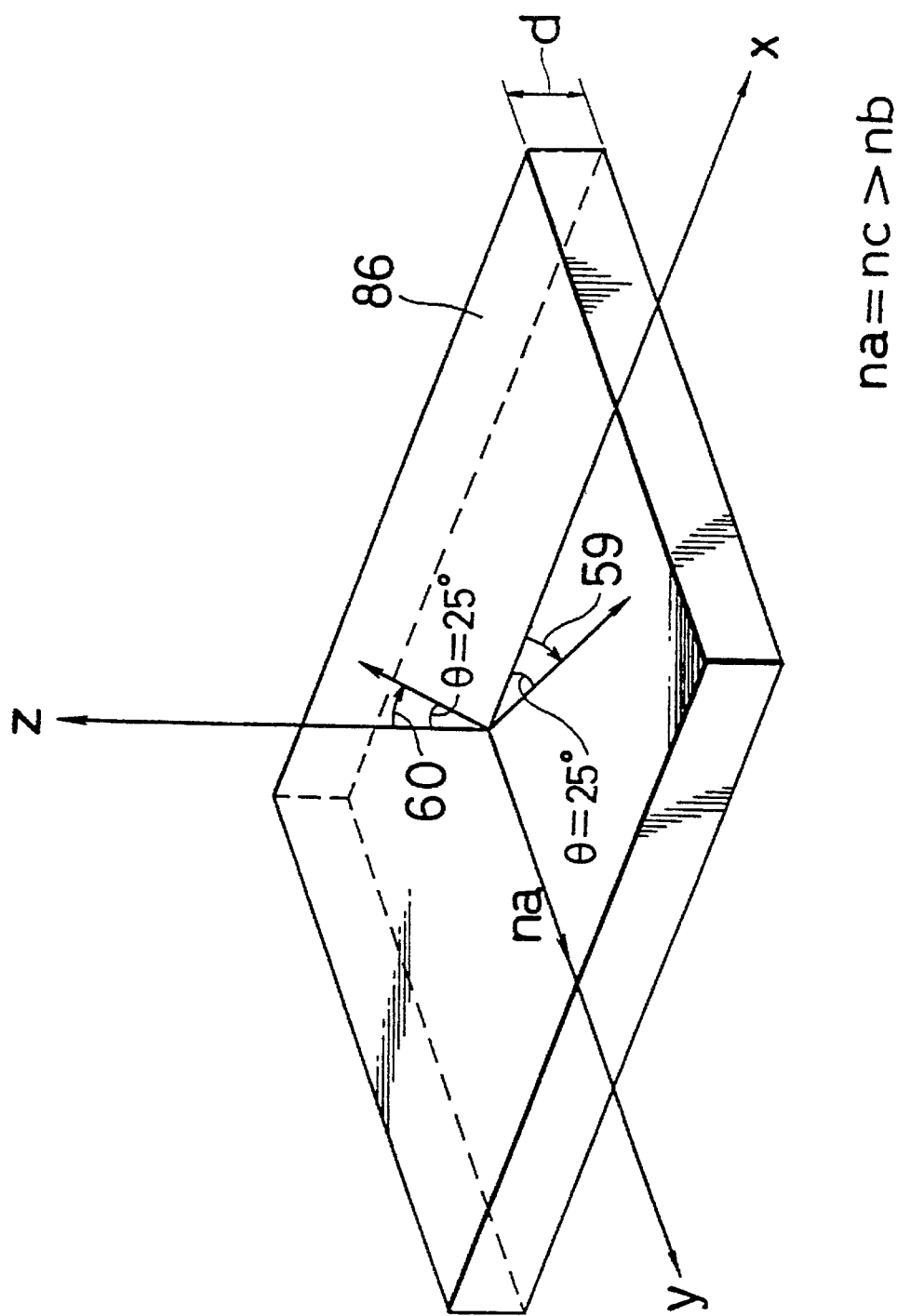
FIG. 27 is a perspective view showing the principal refractive indices ha, rib, nc of a phase difference plate 86 used in the liquid crystal display device 85.

A liquid crystal display device 85 in FIG. 26 is similar in construction to the liquid crystal display device 54 in FIG. 18 except for the phase difference plate 86, and a nematic liquid crystal material with the refractive index anisotropy $\Delta n$ of 0.08 is used as the liquid crystal layer 52, the thickness of the liquid crystal layer 52 is set at 4.5 μm, and a phase difference plate 86 shown in FIG. 27 is used instead of the phase difference plate 41 shown in FIG. 16. The phase difference plate 86 is a drawn and elongated high polymer compound such as polystyrene, being of a uniaxial material with the first retardation (nc–na)xd of 0 nm and second retardation (nc–nb)xd of 200 nm, and the direction of the principal refractive index nb is inclined 25 degrees clockwise indicated by arrow 60 to the normal direction of the surface of the phase difference plate 86, and similarly the direction of the principal refractive index forms an angle of 25 degrees to the surface.

Figure 28:
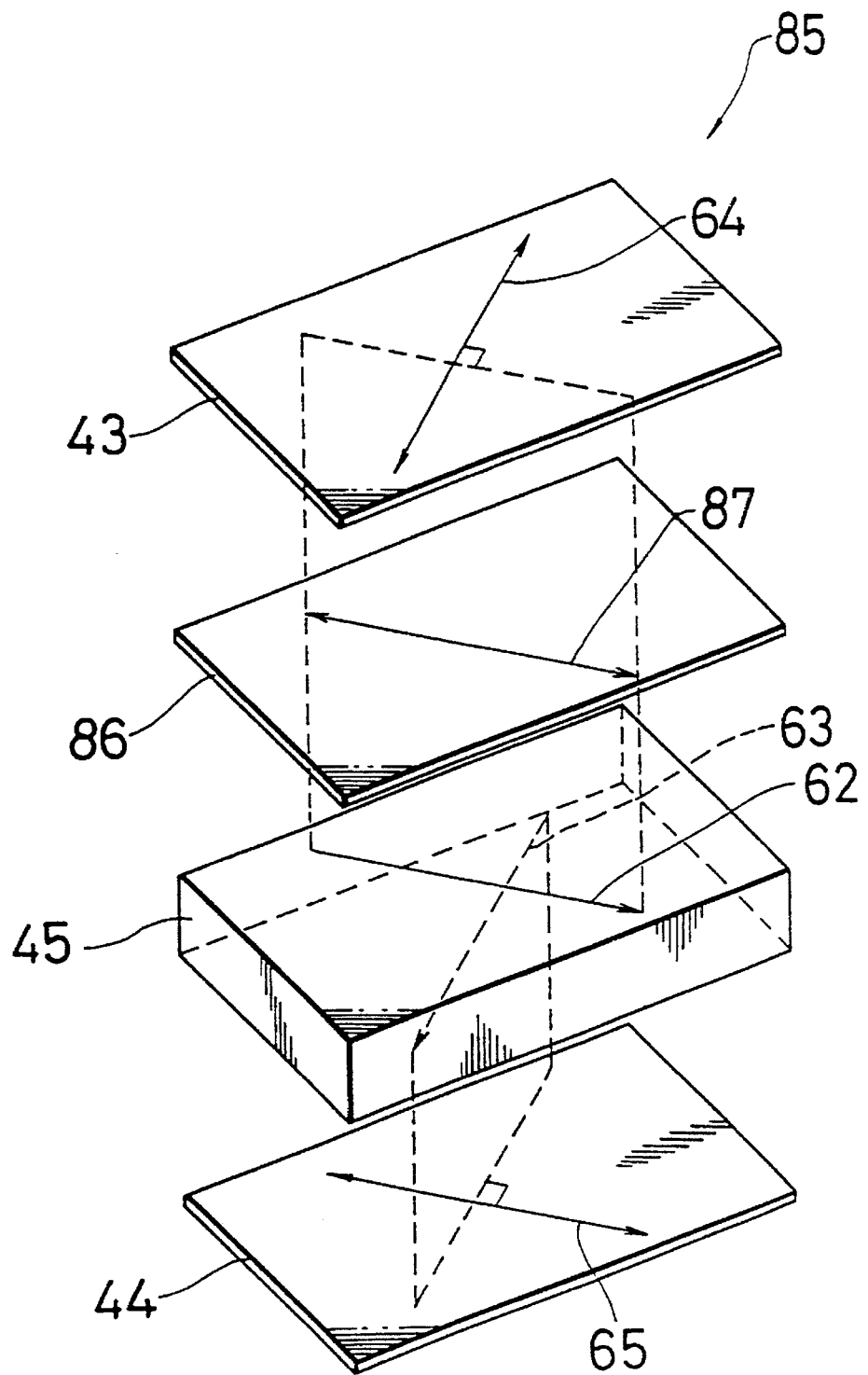
FIG. 28 is a perspective exploded view showing the constitution of the liquid crystal display device 85.

FIG. 28 is a perspective view showing the constitution of the liquid crystal display device 85. As shown in FIG. 28, the transmission axes 64, 65 of polarizers 43, 44 of the liquid crystal display device 85 are configured so as to be vertical to the rubbing directions 62, 63 of the orientation films 50, 51 on the glass substrates 46, 47, respectively, and the inclination direction 87 of the principal refractive index nb in the anisotropic direction of the phase difference plate 86 is set opposite to the rubbing direction 62 of the orientation film 50 of the glass substrate 46. Therefore, when the voltage is applied, the liquid crystal display device 85 allows the light to pass to display white, which is called normally white display.

Figure 29:
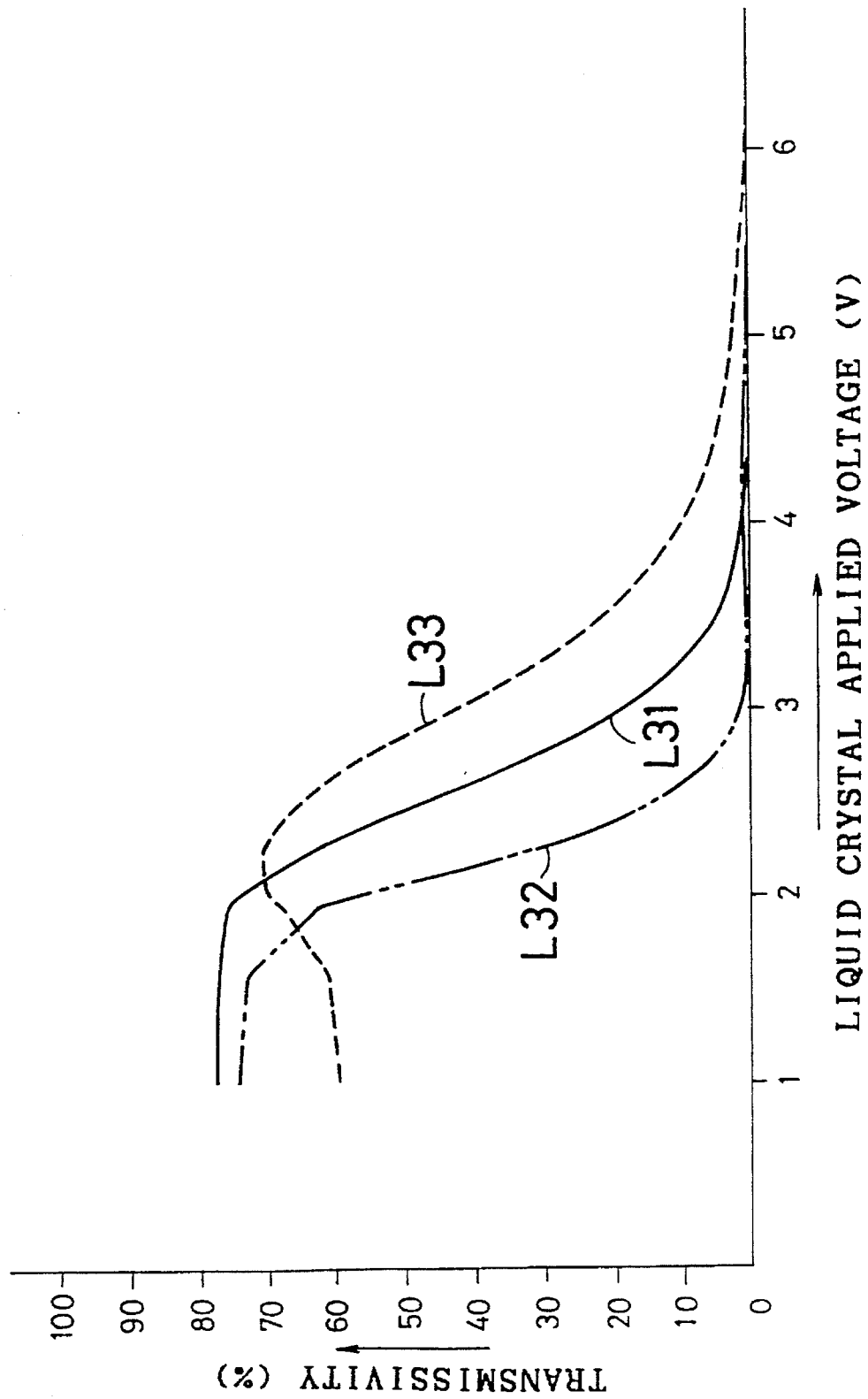
FIG. 29 is a graph showing the transmissivity-liquid crystal applied voltage characteristics of the liquid crystal display device 85 in Example 5.
Figure 31:
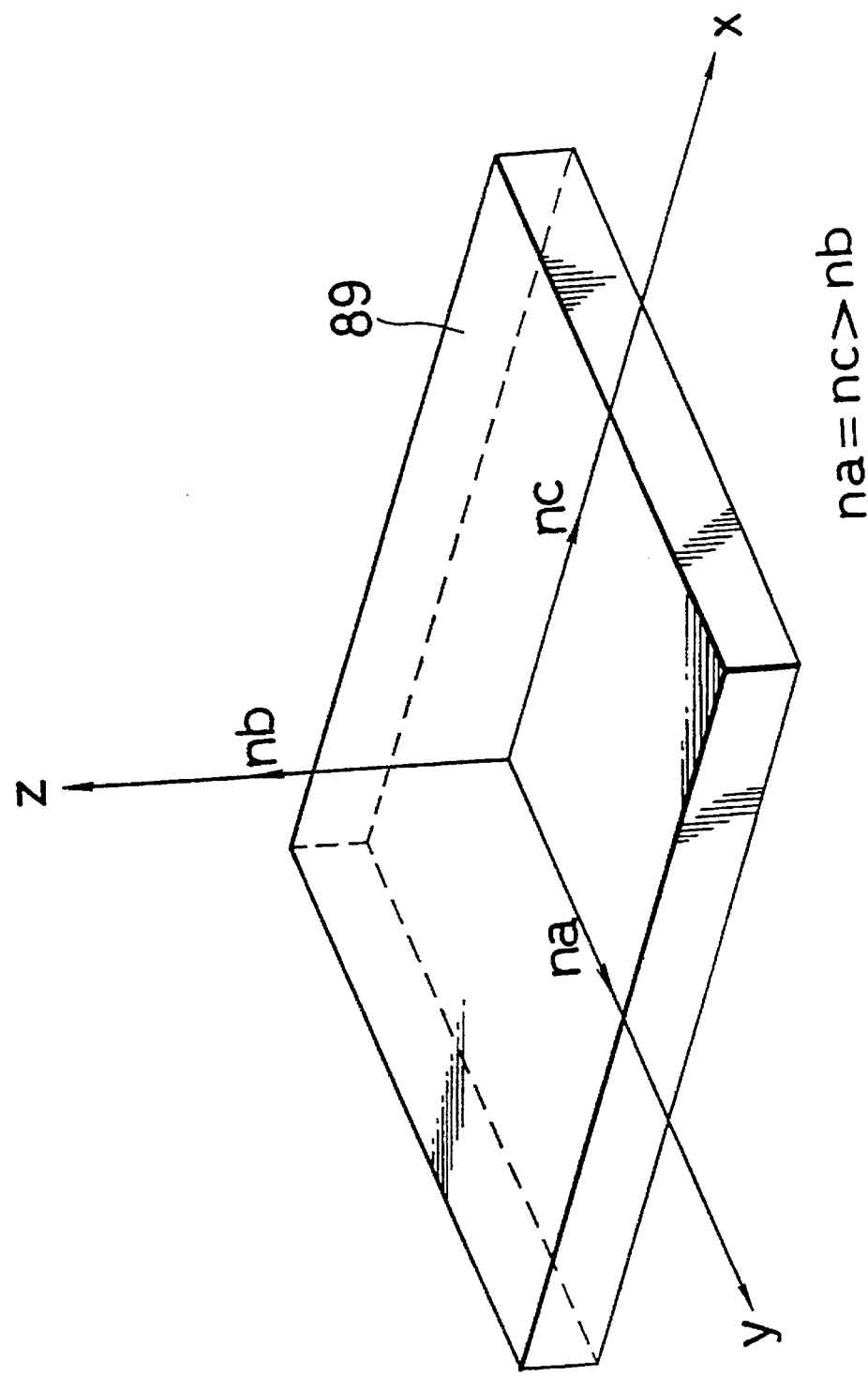
FIG. 31 is a perspective view showing the principal refractive indices ha, nb, nc of a phase difference plate 89 used in the liquid crystal display device 88.

FIG. 29 is a graph showing the applied voltage-transmissivity characteristics of the liquid crystal display device 85. In FIG. 31, the characteristic curve as seen from above the liquid crystal display device 85, that is, from an angle ψ of 0 degree is indicated by solid line L31. The characteristic curves as seen from a position inclined by an angle ψ of 30 degrees in the normal viewing angle direction and anti-viewing angle direction of the liquid crystal display device 85 are represented by lines L32 and L33, respectively. In line L32 in FIG. 29, it is confirmed that the transmissivity is almost flat from the applied voltage of 3.5 V to 5.5 V. It is also known that the transmissivity with voltage applied is hardly changed whether seen from above or when inclined in the viewing angle. In line L33, the transmissivity with voltage applied is lowered considerably, and black is displayed, and it is confirmed that the anti-viewing angle direction is improved.

The contrast ratio of the normal viewing angle direction and anti-viewing angle direction of the liquid crystal display device 85 is shown in Table 2 below.

TABLE 2

| | Contrast ratio | |
|---|---|---|
| | Normal viewing angle direction | Anti-viewing angle direction |
| Liquid crystal display device 85 | 147 | 19 |
| Liquid crystal display device 88 | 11 | 7 |
| Without phase difference plate TN | 42 | 4 |

Comparison 5

Figure 30:
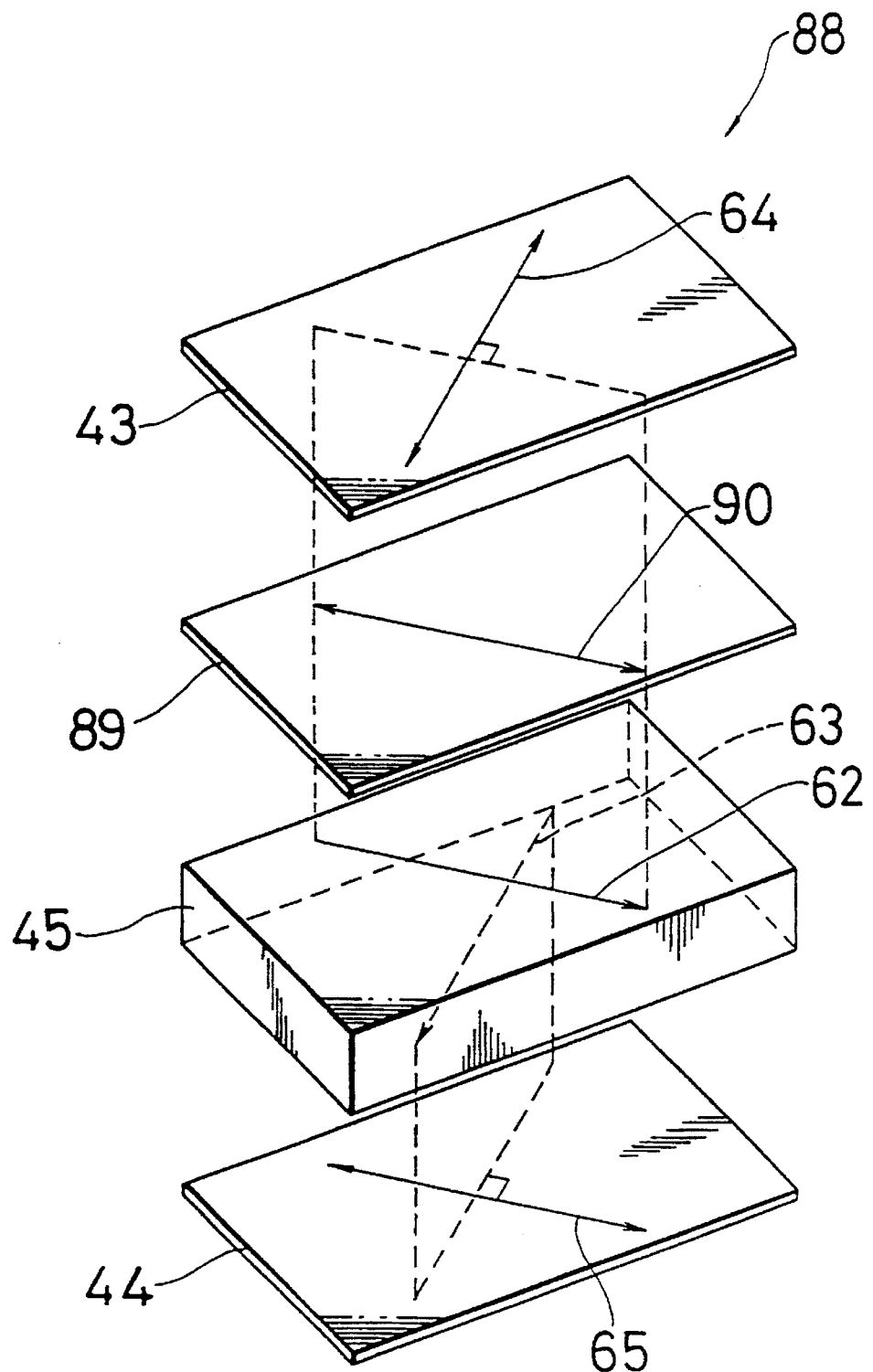
FIG. 30 is a perspective exploded view showing the constitution of a liquid crystal display device 88 in Comparison 5.

A liquid crystal display device 88 in FIG. 30 is similar in construction to the liquid crystal display device 85 in FIG. 26 except for the phase difference plate 89, and a nematic liquid crystal material with the refractive index anisotropy $\Delta n$ of 0.08 is used as the liquid crystal layer 52, the thickness of the liquid crystal layer 52 is set at 4.5 μm, and a phase difference plate 89 shown in FIG. 31 is used instead of the phase difference plate 86 shown in FIG. 27. The phase difference plate 89 is a drawn and elongated high polymer compound such as polystyrene, being of a uniaxial material with the first retardation (nc–na)xd of 0 nm and second retardation (nc–nb)xd of 200 nm, and the direction of the principal refractive index nb is formed parallel to the normal line of the surface. In FIG. 30, moreover, the direction of the principal refractive index nc of the phase difference plate 89 is formed parallel to the surface. The direction 90 of the principal refractive index nc of the phase difference plate 89 is, disposed parallel to the rubbing direction 62 of the orientation film 50 of the glass substrate 46.

Figure 32:
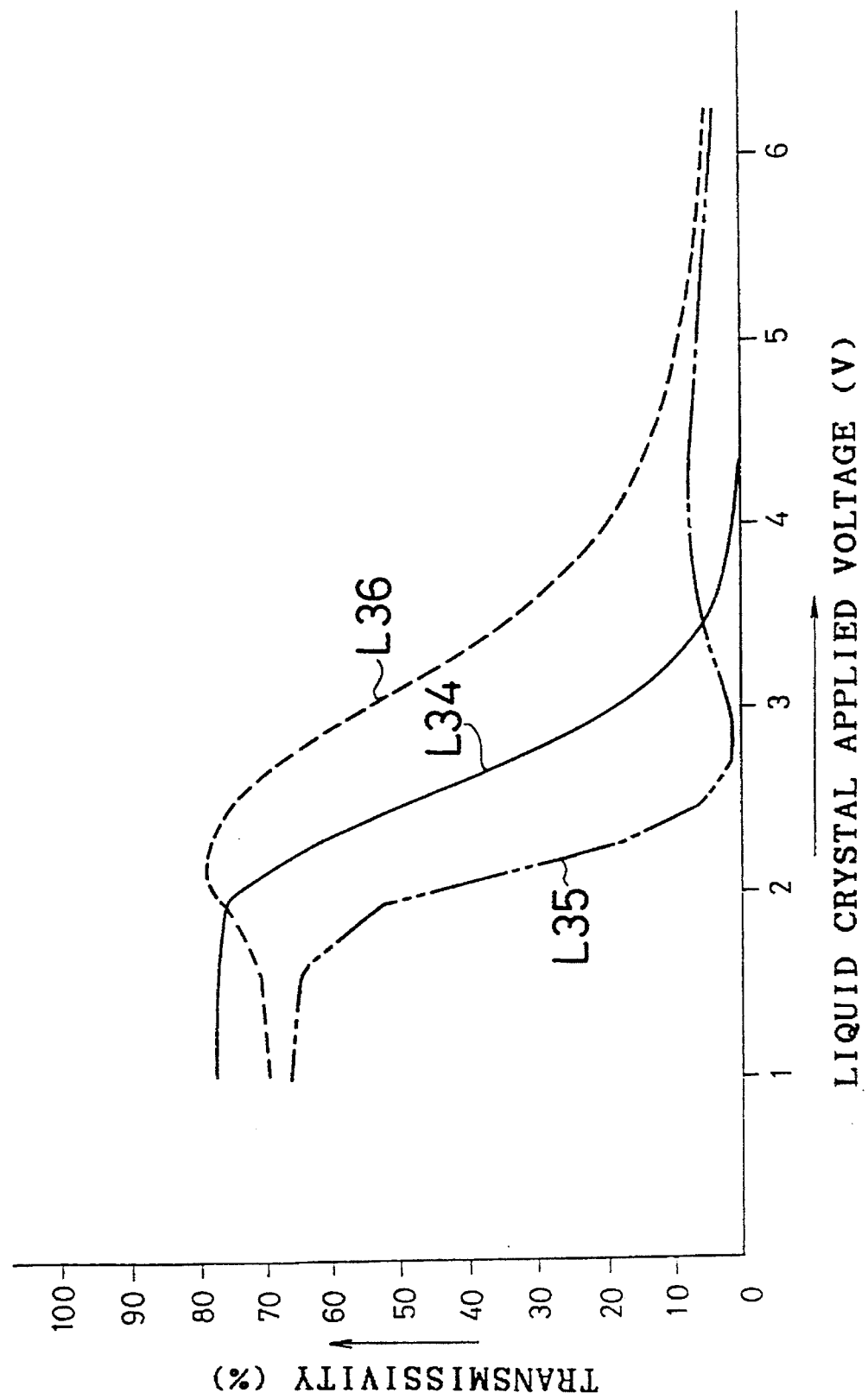
FIG. 32 is a graph showing the transmissivity-liquid crystal applied voltage characteristics of the liquid crystal display device 88 in Comparison 5.

FIG. 32 is a graph showing the applied voltage-transmissivity characteristics of the liquid crystal display device 88. In FIG. 32, the characteristic curve as observing the liquid crystal display device 88 from above is represented by line L34, and the characteristic curves as seen from the position inclined by angle ψ of 30 degrees in the normal viewing angle direction and anti-viewing angle direction are indicated by lines L35 and L36, respectively. In line L34 in FIG. 32, the transmissivity once lowered at applied voltage of 2.7 V was raised again from 3.0 V, and reversal phenomenon was observed. In addition, it was Known that the transmissivity when voltage was applied was lowered when the viewing angle was inclined. Similarly, in line L36 in FIG. 32, it was confirmed that the transmissivity with voltage applied was not lowered completely.

Therefore, the viewing angle characteristics of the liquid crystal display device 85 shown in FIG. 26 were known to be considerably improved as compared with the viewing angle characteristics of the conventional liquid crystal display device 88 shown in FIG. 30. As the phase difference plate 86, meanwhile, oblique orientation of liquid crystal high polymer or rolling of high polymer film may be also employed.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A flat phase difference plate forming a material having optical anisotropy, wherein of the three principal refractive indices of an index ellipsoid, the direction of the minimum principal refractive index is parallel to a surface of the flat plate, and the directions of the other principal refractive indices are inclined to the surface.

2. The phase difference plate as claimed in claim 1, wherein of the three principal refractive indices of the index ellipsoid, the direction of the minimum principal refractive index is parallel to the surface, and the angles $\theta$ formed by the directions of the other principal refractive indices and the surface are in the range of $20° \leq \theta \leq 70°$.

3. A liquid crystal display device comprising:

a liquid crystal display cell having a liquid crystal layer interposed between a pair of light transmittable substrates forming a transparent electrode layer and an orientation film on a surface of said cell, a pair of polarizers disposed at both sides of the liquid crystal display; and at least one phase difference plate as claimed in claims 1 or 2 interposed between the liquid crystal display cell and the polarizers.

4. The liquid crystal display device of claim 3 wherein liquid crystal of the liquid crystal later is twisted about 90 degrees in a thick direction of the liquid crystal layer.

5. The liquid crystal display device of claim 3 wherein the device comprises two phase difference plates, and the inclination angles of the two phase difference plates are approximately equal to each other.

6. A phase difference plate composed by stacking first and second phase difference plates each comprising a plate in which a principal refractive index nb of a refractive index ellipsoid in the normal direction to the surface of the plate is smaller than principal refractive indices na and nc of the index ellipsoid within the surface thereof, wherein in each plate the direction of the principal refractive index nb is inclined to the normal direction of the surface and has a component in the normal direction and a component within the surface, and the inclination angle $\theta$ formed by the direction of the principal refractive index nb and the surface is $20° \leq \theta \leq 70°$, and further wherein in each plate the directions of the principal refractive indices nb and one of nc or na are both rotated counterclockwise or clockwise about the direction of the other of na or nc within the surface, wherein an angle obtained by projecting the inclination direction of each principal index nb of the first and second stacked phase difference plates on the surface is about 90 degrees.

7. A liquid crystal display device comprising:

a liquid crystal display cell having a liquid crystal layer interposed between a pair of light permeable substrates forming a transparent electrode layer and an orientation film on the surface of said liquid crystal layer confronting said substrate, a pair of polarizers disposed at both sides of the liquid crystal display cell, and a phase difference plate as claimed in claim 6 disposed between the liquid crystal display cell and each of the polarizers.

8. The liquid crystal display device as claimed in claim 7 wherein first and second phase difference plates are disposed so that the angle formed by the direction of inclination of the index nb in the normal direction of the first phase difference plate and the direction of inclination of the principal refractive index nb in the normal direction of the second phase difference plate is about 90 degrees clockwise, in a manner such that the first phase difference plate is disposed so that the rubbing direction of a side of said substrate of the liquid crystal display cell which is remote from said first phase difference plate is nearly equal to the inclination direction of the index nb in the normal direction of the first phase difference plate, and the second phase difference plate is disposed so that the rubbing direction of a side of said substrate of the liquid crystal display cell which is nearest to said second phase difference plate is nearly opposite to the inclination direction of the index nb in the normal direction of the second phase difference plate.

9. The liquid crystal display device of claim 7 wherein liquid crystal of the liquid crystal layer is twisted about 90 degrees in the thick direction of the liquid crystal layer.

10. The liquid crystal display device of claim 7 wherein the device comprises two phase difference plates, and the inclination angles of the two phase difference plates are approximately equal to each other.

11. A liquid crystal display device comprising:

a liquid crystal display cell having a liquid crystal layer interposed between a pair of light transmittable substrates forming a transparent electrode layer and an orientation film on confronting surfaces of said liquid crystal layer and said substrate, a pair of polarizers disposed at both sides of the liquid crystal display cell, and at least one phase difference plate interposed between the liquid crystal display cell and at least one of said polarizers, wherein each phase difference plate has a principal refractive index nb of a refractive index ellipsoid in the normal direction to the surface of the plate which is smaller than principal refractive indices na and nc of the index ellipsoid within the surface thereof, wherein in each phase difference plate the direction of the principal refractive index nb is inclined to the normal direction of the surface and has a component in the normal direction and a component within the surface, and the inclination angle $\theta$ formed by the direction of the principal refractive index nb and the surface is $20° \leq \theta \leq 70°$, and wherein in each phase difference plate the directions of the principal refractive indices nb and one of nc or na are both rotated counterclockwise or clockwise about the direction of the other of na or nc within the surface, and further wherein the angle between the polarizing axis and the direction obtained by projecting the inclination direction of the index nb of each phase difference plate on the surface is about 90 degrees.

12. The liquid crystal display device as claimed in claim 11 wherein the inclination direction of the index nb in the normal direction of at least one phase difference plate is nearly in the opposite direction of the rubbing direction of the substrate disposed close to the at least one phase difference plate.

13. The liquid crystal display device of claim 11 wherein liquid crystal of the liquid crystal layer is twisted about 90 degrees in a thick direction of the liquid crystal layer.

* * * * *